United States Patent [19]
Onishi et al.

[11] Patent Number: 5,620,630
[45] Date of Patent: Apr. 15, 1997

[54] POLYMER DISPERSED LIQUID CRYSTAL DISPLAY DEVICE, AND A METHOD FOR PRODUCING THE SAME

[75] Inventors: Noriaki Onishi, Osaka; Nobuaki Yamada, Higashiosaka; Masahiko Kondo, Kitakatsuragi-gun; Nobukazu Nagae, Tenri; Toshiyuki Hirai, Kashihara; Shuichi Kohzaki, Nara, all of Japan

[73] Assignee: Sharp Kabushiki Kaisha, Osaka, Japan

[21] Appl. No.: 456,809

[22] Filed: Jun. 1, 1995

Related U.S. Application Data

[62] Division of Ser. No. 128,300, Sep. 29, 1993, Pat. No. 5,450,220.

[30] Foreign Application Priority Data

Sep. 30, 1992 [JP] Japan .................................. 4-261365
Sep. 3, 1993 [JP] Japan .................................. 5-220315

[51] Int. Cl.⁶ .............................. C09K 19/52; G02F 1/13
[52] U.S. Cl. .......................... 252/299.01; 428/1; 349/89; 349/167
[58] Field of Search ................... 252/299.01; 359/51, 359/52, 99; 428/1

[56] References Cited

U.S. PATENT DOCUMENTS

| | | | |
|---|---|---|---|
| 4,435,047 | 3/1984 | Fergason | 359/51 X |
| 4,890,902 | 1/1990 | Doane et al. | 359/75 X |
| 5,240,636 | 8/1993 | Doane et al. | 252/299.01 |
| 5,323,251 | 6/1994 | Coates et al. | 359/51 |
| 5,327,271 | 7/1994 | Takeuchi et al. | 359/75 |
| 5,356,557 | 10/1994 | Jubb et al. | 252/299.01 |
| 5,376,302 | 12/1994 | Coates et al. | 252/299.01 |
| 5,450,220 | 9/1995 | Onishi et al. | 359/51 |
| 5,476,611 | 12/1995 | Nolan et al. | 252/299.01 |

FOREIGN PATENT DOCUMENTS

| | | |
|---|---|---|
| 0278721 | 8/1988 | European Pat. Off. |
| 0484163 | 5/1992 | European Pat. Off. |
| 0492668 | 7/1992 | European Pat. Off. |
| 58-501631 | 9/1983 | Japan |
| 61-502128 | 9/1986 | Japan |
| 62-277412 | 12/1987 | Japan |
| 63-43993 | 2/1988 | Japan |
| 63-264629 | 11/1988 | Japan |
| 63-280742 | 11/1988 | Japan |
| 3-219211 | 9/1991 | Japan |
| 3-245120 | 10/1991 | Japan |
| 4-1724 | 1/1992 | Japan |
| 4-14015 | 1/1992 | Japan |
| 4-70714 | 3/1992 | Japan |
| 5-27242 | 2/1993 | Japan |
| WO83/01016 | 3/1983 | WIPO |
| WO85/04262 | 9/1985 | WIPO |

OTHER PUBLICATIONS

J.L. West et al, Appl. Phys. Lett., (26), Jun. 29, 1992, "Effect of Polymer Matrix Glass Transition Temperature on Polymer Dispersed Liquid Crystal Electro–optics".

P. Jiang et al, The 17th Liquid Crystal Forum, "Studies on Electro–Optics of Multi–Twisting–Power Cholesteric Focal Conid Texture With Polymer Matrix", 1991.

S. Niiyama et al, Polymer Preprints, Japan, vol. 38, No. 7, 1989, "A Polymer Liquid Crystal Composite (II)".

Ji et al, "A Study of the Surface Anchoring at a Polymer/Liquid Crystal Interface in the Neighbourhood of the Glass Transition", Proceedings of The 14th International Liquid Crystal Conference, 21 Jun. 1992, Pisa, Italy, vol. 14, No. 6, 1993, London GB, pp. 1885–1893.

Vaz et al, Molecular Crystals and Liquid Crystals (Inc. Nonlinear Optics), vol. 197, Mar. 1991 "Polymer–Dispersed Liquid Crystal Films Formed by Electron–Beam Cure", pp. 83–101.

Montgomery, Jr., Proceedings of SPIE, Liquid Crystal Chemistry Physics and Applications, vol. 1080, 1989, pp. 242–249, "Polymer–Dispersed Liquid Crystal Films for Light Control Applications".

Primary Examiner—Shean C. Wu
Attorney, Agent, or Firm—Nixon & Vanderhye P.C.

[57] ABSTRACT

A liquid crystal display device according to the present invention includes a pair of electrode substrates and a polymer dispersed liquid crystal complex film interposed between the pair of substrates. The polymer dispersed liquid crystal complex film includes a liquid crystal composition and a polymer resin composition. It is ensured that a value $\Delta T$ is 25° C. or less, and a glass transition temperature $T_g$ of the polymer resin composition is 60° C. or more, the value $\Delta T$ being defined as a difference between a phase transition temperature $T_{CI}$ of the liquid crystal composition between a liquid crystal phase and an isotropic liquid phase thereof and a phase transition temperature $T_{matrix}$ of the polymer dispersed liquid crystal complex film.

9 Claims, 10 Drawing Sheets

POLYMER DISPERSED LIQUID CRYSTAL DISPLAY DEVICE, AND A METHOD FOR PRODUCING THE SAME

This is a divisional of application Ser. No. 08/128,300, filed Sep. 29, 1993, now U.S. Pat. No. 5,450,220.

BACKGROUND OF THE INVENTION

1. Field of the Invention

The present invention relates to a polymer dispersed liquid crystal complex film, a liquid crystal display device, and a method for producing the same. A polymer dispersed liquid crystal display device according to the present invention is, owing to a broad range of viewing angles thereof, applicable to a flat display device such as a liquid crystal panel to be used in an optical projector, a personal computer, an amusement device, or a television set. Moreover, the polymer dispersed liquid crystal display device is, owing to the excellently uniform contrast thereof, applicable to a display device to be used in a projection display. Furthermore, the polymer dispersed liquid crystal display device is, in view of a shutter effect thereof, applicable to a display board, a window, a door, a wall, and the like.

2. Description of the Related Art

There have been realized display devices of a TN (Twisted Nematic) mode or an STN (Super Twisted Nematic) mode, as display devices utilizing electrooptical effects. Both display modes use nematic liquid crystal. A display mode using ferroelectric liquid crystal has also been proposed. However, these display modes require a polarizing plate and an orientation treatment. Display modes which utilize the light-scattering property of liquid crystal but do not require a polarizing plate are, for example, a DS (Dynamic Scattering) mode and a PC (Phase Change) mode.

There has been developed a display device which requires neither a polarizing plate nor an orientation treatment. It is known that such a display device can be realized by dispersing liquid crystal droplets sealed in capsules in a polymer medium so as to form a film. Proposed materials for forming such capsules are gelatine, gum arabic, polyvinylalcohol, and the like, as is disclosed in Japanese National Publication No. 58-501631, U.S. Pat. No. 4435047, etc.

This type of conventional art amounts to the following technique: An ordinary refractive index $n_o$ of a liquid crystal molecule and a refractive index $n_p$ of the polymer medium are made to be equal. As a result, a transparent state is displayed when a voltage is applied, since the liquid crystal molecules are oriented in the same direction. A white state is displayed when no voltage is applied, since the liquid crystal molecules are oriented in various directions (random orientation) so that the refractive indices of the liquid crystal droplets deviate from the ordinary refractive index $n_o$, causing scattering of light at interfaces of the liquid crystal and the polymer. Inevitably, it is necessary to carefully choose a liquid crystal material and a polymer material in order to ensure that the ordinary refractive index $n_o$ of the liquid crystal and the refractive index $n_p$ of the polymer are approximately the same so that light is sufficiently transmitted when a voltage is applied. Japanese Laid-Open Patent Publication Nos. 63-43993 and 3-245120 disclose methods for producing a transparent liquid crystal panel by ensuring that the ratio of the ordinary refractive index $n_o$ of liquid crystal to the refractive index $n_p$ of a polymer film are in the range of 0.98 to 1.02.

A polymer dispersed liquid crystal display device has also been proposed which utilizes the same principle as that described above. This display device is a liquid crystal display device using a polymer dispersed liquid crystal complex film. The complex film has a structure in which liquid crystal regions, each constituted essentially by a liquid crystal droplet or continuous liquid crystal droplets, are partitioned by polymer walls. A known method for producing such a polymer dispersed liquid crystal display device is disclosed An Japanese National Publication No. 61-502128. In this method, in order to attain sufficient control of the diameters of liquid crystal droplets, the above-mentioned liquid crystal display device is produced through phase separation, starting from a mixture of a liquid crystal material and a light-curable (photopolymerizable) material.

Some conventional modes in which scattering of light occurring at interfaces of liquid crystal regions and polymer walls is controlled are applicable to a polymer dispersed liquid crystal device. Examples of such conventional modes are a TN mode, an STN mode, an ECB (electrically controlled birefringence) mode, and an FLC (Ferroelectric Liquid Crystal) mode.

In a case where a polymer dispersed liquid crystal device is used as a liquid crystal device for optical projection, or as a transmission liquid crystal display device provided with a back light, display characteristics of the liquid crystal device are required to be stable against heat for long periods so as to cope with heating effects due to emission of light by a metal halide lamp used as a light source, a cold-cathode tube, an EL film, and the like, and/or emission of heat An the operation of the device.

However, a liquid crystal display device produced with the above method has the following problems: a) a display panel of the liquid crystal display device has poor resistance against heat because of a mutual dissolution effect of the liquid crystal material and the polymer (light-curable) material, that is, dissolution of unreacted light-curable monomers and oligomers into the liquid crystal material and elution of the liquid crystal material into the polymer material; b) display characteristics of the liquid crystal panel are influenced by changes in thermal circumstances; c) the response speed of the liquid crystal decreases because the viscosity of the liquid crystal material increases owing to the above-mentioned mutual dissolution effect.

Japanese Laid-Open Patent Publication Nos. 3-219211, 4-1724, 4-70714, etc. are known to deal with improvement of heat resistance of liquid crystal display devices, describing a glass transition temperature $T_g$ of a polymer material to be used for a matrix. However, in considering thermal characteristics of a whole panel of a polymer dispersed liquid crystal device or a polymer-matrix type liquid crystal device, influence of the liquid crystal material, which is a main component of the device, must be taken into account. In particular, thermal characteristics of a complex system consisting of materials of different kinds, such as a liquid crystal-polymer complex film, are known to be different from those of a single material film. Therefore, it is insufficient to pay attention only To the glass transition temperature $T_g$ of the polymer material to consider heat resistance that affects the display characteristics. Moreover, any of the methods for producing a polymer dispersed liquid crystal device disclosed in the above publications is a 'solvent evaporation method', in which the liquid crystal material and the polymer material are dissolved in a common solvent, applied to a substrate, and then dried so as to form a thin film containing liquid crystal. Since it is difficult to control a phase separation process of a mixture of the liquid crystal material and the polymer material by this solvent evaporation method, a polymer dispersed liquid crystal device produced thereby inevitably has a very high driving voltage. As a result, such a polymer dispersed liquid crystal, when applied to a flat panel display of an active matrix driving system, has a problem that the flat panel display is difficult to be realized since the driving voltage therefor exceeds the withstand voltage of an LSI circuit used in a driving circuit.

Effects of a glass transition temperature $T_g$ of a polymer material on electrooptical characteristics of polymer dispersed liquid crystal. are also described in "Appl. Phys. Lett. 60, 3238 (1992)". However, a liquid crystal device disclosed in this article is also produced by a solvent evaporation method, and therefore has a major problem that its driving voltage exceeds 50 V.

Moreover, "Extended Abstracts", p. 310 (The 17th Liquid Crystal Forum, 1991) reports on a relationship between voltages and light transmittances, and on methods to realize a higher response speed, with respect to a polymer dispersed liquid crystal display device in which small amounts of cholesteric liquid crystal and smectic liquid crystal are added. However, the liquid crystal display device reported in the above has such display quality problems that contrast thereof is low because of insufficient light-scattering characteristics, and that the voltage-transmittance hysteresis is large, and that it is difficult to realize intermediate gray tones.

On the other hand, Japanese Laid-Open Patent Publication No. 4-14015 discloses a material including a polymer containing fluorine, as a resin material for forming a polymer wall. However, no attention is paid to influences of thermal circumstances on display characteristics, including heat resistance, of a liquid crystal panel in the structure. The structure therefore has poor practicality.

A conventional liquid crystal display mode which utilizes optical rotatory power of liquid crystal molecules is known to have a major problem of insufficient viewing angle characteristics. This problem will be described with reference to FIGS. 16A to 16C, which are cross-sectional views showing a conventional liquid crystal display device of a TN mode. As is shown in FIGS. 16A to 16C, this liquid crystal display device of a TN mode has a structure in which a display medium including liquid crystal molecules 11 are interposed between a pair of substrates 12 and 13. FIG. 16A describes an initial state of the liquid crystal display device; FIG. 16B describes a state where the liquid crystal display device is displaying an intermediate gray tone; FIG. 16C describes a state where the liquid crystal device is being transparent.

In an initial state, as is shown in FIG. 16A, the liquid crystal molecules 11 are twisted by 90°, and also stand at a certain angle (pre-tilt angle) in one direction. In a transparent state, as is shown in FIG. 16C, the liquid crystal molecules 11 are oriented vertically with respect to the substrates 12 and 13. Therefore, each liquid crystal molecule 11 stands at the same angle, irrespective of the viewing angle. In other words, each liquid crystal molecule 11 has the same apparent refractive index irrespective of the viewing angle. However, in a state where the liquid crystal display device is displaying an intermediate gray tone, as is shown in FIG. 16B, since the liquid crystal molecules 11 are oriented at certain angles with respect to the normal line of the transparent substrates 12 and 13, the liquid crystal molecules 11, as observed from a direction a, stand at different angles than in cases where they are observed from a direction B. In other words, the apparent refractive index of each liquid crystal molecule 11 varies depending on the viewing angle. As a result, contrast of an image displayed on the display device greatly varies depending on whether the image is observed from the direction A or the direction B. In some extreme cases, display defects such as inversion of the image occur. As is described above, conventional display modes have a problem of inadequate viewing angle characteristics.

The inventors previously invented a polymer-matrix type liquid crystal display device in which a liquid crystal material is gathered in pixel regions of a liquid crystal panel, and liquid crystal domains are disposed radially in each pixel region. The liquid crystal display device is bright, and has drastically improved viewing angle characteristics. The liquid crystal display device, in reference to the structure thereof, includes a pair of substrates, polymer walls (which consist essentially of a polymer material) arranged in a matrix shape interposed between the substrates, liquid crystal regions partitioned by the polymer walls, and at least one polarizing plate formed on the substrates. Within each liquid crystal region, liquid crystal molecules gradually stand in the directions of the polymer walls as a voltage is applied, owing to an interaction of the liquid crystal molecules and the polymer walls. Therefore, as is described above, the apparent refractive index of the liquid crystal molecules as a whole becomes substantially the same irrespective of the viewing angle, whereby the viewing angle characteristics are greatly improved.

The polymer matrix type liquid crystal display device uses a mixture consisting of materials similar to those which were disclosed in the above-mentioned Japanese National Publication No. 61-502128, and is produced by irradiating the mixture with light, while disposing a light-intercepting object such as a photomask over the pixel regions. Accordingly, this liquid crystal display device, invented by the inventors, has the same problems as those of the conventional polymer dispersed liquid crystal display device disclosed in Japanese National Publication No. 61-502128.

Moreover, in the above-mentioned liquid crystal display device, liquid crystal domains of each liquid crystal region are oriented either radially or randomly with respect to the center of the corresponding pixel. Therefore, scattering of light occurs locally at interfaces of the liquid crystal and the polymer walls in cases where the liquid crystal and the polymer walls have a large difference in refractive indices thereof. Accordingly, there has also been a problem of low display quality, etc. because the contrast of the display device is low and a displayed image has a coarse appearance.

SUMMARY OF THE INVENTION

A polymer dispersed liquid crystal complex film according to the present invention comprises: a liquid crystal composition; and a polymer resin composition, wherein a value ΔT is 25° C. or less and a glass transition temperature $T_g$ of the polymer resin composition is 60° C. or more, the value ΔT being defined as a difference between a phase transition temperature $T_{matrix}$ of the polymer dispersed liquid crystal complex film and a phase transition temperature $T_{CI}$ of the liquid crystal composition between a liquid crystal phase and an isotropic liquid phase thereof.

Alternatively, a liquid crystal display device according to the present invention comprises: a pair of electrode substrates; and a polymer dispersed liquid crystal complex film interposed between the pair of substrates, the polymer dispersed liquid crystal complex film including a liquid crystal composition and a polymer resin composition, wherein a value ΔT is 25° C. or less, and a glass transition temperature $T_g$ of the polymer resin composition is 60° C. or more, the value ΔT being defined as a difference between a phase transition temperature $T_{CI}$ of the liquid crystal composition between a liquid crystal phase and an isotropic liquid phase thereof and a phase transition temperature $T_{matrix}$ of the polymer dispersed liquid crystal complex film.

In one embodiment of the invention, the value ΔT is 10° C. or less.

In another embodiment of the invention, the liquid crystal composition has a positive anisotropy of dielectric constant, and includes at least one of a fluorine-compound and a chlorine-compound.

In still another embodiment of the invention, the polymer resin composition includes at least one selected from %he group consisting of a fluorine-containing polymer, a chlorine-containing polymer, and a silicon-containing polymer.

In still another embodiment of the invention, the liquid crystal composition includes at least one dichroic dye.

In still another embodiment of the invention, the liquid crystal composition includes at least one of an optically active chiral dopant and a cholesteric liquid crystal added in a ratio, by weight, in the range of 0.1% to 10% thereto.

In still another embodiment of the invention, orientation means for orienting the liquid crystal composition is provided for at least one of the substrates.

In still another embodiment of the invention, the orientation means includes an insulating film.

Alternatively, a liquid crystal display device according to the present invention comprises: a pair of electrode substrates; and a display medium interposed between the pair of substrates, the display medium including a polymer matrix and at least one liquid crystal region partitioned by the polymer matrix, the polymer matrix being made of a polymer resin composition, and the liquid crystal region being made of a liquid crystal composition, wherein a value ΔT is 25° C. or less, and a glass transition temperature $T_g$ of the polymer resin composition is 50° C. or more, the value ΔT being defined as a difference between a phase transition temperature $T_{matrix}$ of the display medium and a phase transition temperature $T_{CI}$ of the liquid crystal composition between a liquid crystal phase and an isotropic liquid phase thereof.

In one embodiment of the invention, the value ΔT is 10° C. or less.

In another embodiment of the invention, each liquid crystal region has a surface parallel to each of the pair of electrode substrates, and occupies a larger area inside a pixel region than outside the pixel region.

In still another embodiment of the invention, the liquid crystal composition has a positive anisotropy of dielectric constant, and includes at least one of a fluorine-containing compound and a chlorine-containing compound.

In still another embodiment of the invention, the polymer resin composition includes at least one selected from the group consisting of a fluorine-containing polymer, a chlorine-containing polymer, and a silicon-containing polymer.

In still another embodiment of the invention, the liquid crystal composition includes at least one dichroic dye.

In still another embodiment of the invention, the liquid crystal composition includes at least one of an optically active chiral dopant and a cholesteric liquid crystal added in a ratio, by weight, in the range of 0.1% to 10% thereto.

In still another embodiment of the invention, orientation means for orienting the liquid crystal composition is provided for at least one of the substrates.

In still another embodiment of the invention, the orientation means includes an insulating film.

In still another embodiment of the invention, a polarizing plate is provided on at least one of the substrates.

A method for producing a polymer dispersed liquid crystal complex film according to the present invention includes the steps of: a step for preparing a mixture of a polymerizable material and a liquid crystal material, wherein the polymerizable material includes a monofunctional monomer and at least one of a multifunctional monomer and a multifunctional oligomer mixed at a ratio in the range of 93:7 to 40:60; and a phase separation step for processing the mixture into a polymer dispersed liquid crystal complex film by a phase separation conducted through polymerization, the polymer dispersed liquid crystal complex film consisting of a liquid crystal composition and a polymer resin composition, wherein a value ΔT is 25° C. or less, and a glass transition temperature $T_g$ of the polymer resin composition is 60° C. or more, the value ΔT being defined as a difference between a phase transition temperature $T_{matrix}$ of the polymer dispersed liquid crystal complex film and a phase transition temperature $T_{CI}$ of the liquid crystal composition between a liquid crystal phase and an isotropic liquid phase thereof.

Alternatively, a method for producing a polymer dispersed liquid crystal display device according to the present invention includes the steps of: a step for preparing a mixture of a polymerizable material and a liquid crystal material, wherein the polymerizable material includes a monofunctional monomer and at least one of a multifunctional monomer and a multi-functional oligomer mixed at a ratio in the range of 93:7 to 40:60; and a phase separation step for processing the mixture by a phase separation conducted through polymerization into a polymer dispersed liquid crystal complex film as a display medium interposed between a pair of electrode substrates, the polymer dispersed liquid crystal complex film consisting of a liquid crystal composition and a polymer resin composition, wherein a value ΔT is 25° C. or less, and a glass transition temperature $T_g$ of the polymer resin composition is 60° C. or more, the value ΔT being defined as a difference between a phase transition temperature $T_{matrix}$ of the polymer dispersed liquid crystal complex film and a phase transition temperature $T_{CI}$ of the liquid crystal composition between a liquid crystal phase and an isotropic liquid phase thereof.

In one embodiment of the invention, the phase separation step includes a first phase separation step for phase-separating the mixture through polymerization, and a second phase separation step for further phase-separating the mixture through polymerization, the second phase separation step being conducted at a lower temperature than the first phase separation step.

In another embodiment of the invention, the polymerization is conducted by irradiating the mixture with light, the light having a distribution of intensities ranging from high to low.

In still another embodiment of the invention, the light having a distribution of intensities ranging from high to low is obtained through means for substantially lowering the intensity of the light at a pixel region.

In still another embodiment of the invention, the liquid crystal composition obtained through the phase separation step has a positive anisotropy of dielectric constant, and includes at least one of a fluorine-containing liquid crystal compound and a chlorine-containing liquid crystal compound.

In still another embodiment of the invention, the polymer resin composition obtained through the phase separation step includes at least one selected from the group consisting of a fluorine-containing compound, a chlorine-containing compound, and a silicon-containing compound.

In still another embodiment of the invention the liquid crystal composition obtained through the phase separation step includes at least one dichroic dye.

In still another embodiment of the invention, the liquid crystal composition obtained through the phase separation step includes at least one of an optically active chiral dopant and a cholesteric liquid crystal added in a ratio, by weight, in a range of 0.1% to 10% thereto.

Alternatively, a liquid crystal display device according to the present invention comprises: a pair of electrode substrates; and a display medium interposed between the pair of substrates, the display medium including a polymer matrix and at least one liquid crystal region partitioned by the polymer matrix, the polymer matrix being made of a polymer resin composition, and the liquid crystal region being made of a liquid crystal composition, wherein a refractive index $n_p$ of the polymer resin composition, an ordinary refractive index $n_o$ of the liquid crystal composition, and an extraordinary refractive index $n_e$ of the liquid crystal composition satisfy the following relationship:

$$n_o-0.04 \leq n_p \leq (n_e+n_o)/2.$$

In one embodiment of the invention, each liquid crystal region includes at least one liquid crystal domain oriented randomly.

In another embodiment of the invention, each liquid crystal region includes at least one liquid crystal domain oriented radially.

In still another embodiment of the invention, orientation means for orienting the liquid crystal composition is provided for at least one of the substrates.

In still another embodiment of the invention, a polarizing plate is provided on at least one of the substrates.

Alternatively, a method for producing a liquid crystal display device includes the steps of: a step for preparing a mixture of a polymerizable material and a liquid crystal material; and a phase separation step for forming a display medium made of a polymer resin composition and a liquid crystal composition by phase separation through polymerization conducted by irradiating the mixture with light having a distribution of intensities ranging from high to low, the display medium interposed between a pair of substrates, wherein a refractive index $n_p$ of the polymer resin composition, an ordinary refractive index $n_o$ of the liquid crystal composition, and an extraordinary refractive index $n_e$ of the liquid crystal composition satisfy the following relationship:

$$n_o-0.04 \leq n_p \leq (n_e+n_o)/2.$$

In one embodiment of the: invention, the light having a distribution of intensities ranging from high to low is obtained through means for substantially lowering the intensity of the light at a pixel region.

A polymer dispersed liquid crystal complex film and a liquid crystal display device according to the present invention includes a liquid crystal composition and a polymer resin composition. The polymer dispersed liquid crystal display device and the liquid crystal display device each have a value $\Delta T$ of 25° C. or less, and a glass transition temperature $T_g$ of 60° C. or more. The value $\Delta T$ is correlated with electrooptical characteristics and heat resistance characteristics, so that the electrooptical characteristics and the thermal characteristics are improved by ensuring that the value $\Delta T$ is 25° C. or more.

In a method for producing a polymer dispersed liquid crystal complex film and a liquid crystal display device according to the present invention, phase separation of the liquid crystal composition and the polymer resin composition is conducted through two polymerization reactions. Phase separation through a polymerization reaction is conducted at a lower temperature at the second phase separation step than at the first phase separation step. Thus, although an amount of a polymerizable material remains unreacted, i.e. unpolymerized, and therefore is dissolved in the liquid crystal composition at the first phase separation step, a portion of the polymerizable material comes out undissolved so as to be polymerized at the second phase separation step, thus further advancing the phase separation. Accordingly, the amount of the unreacted polymer material which is dissolved in the liquid crystal composition is reduced. In other words, the value $\Delta T$ can be further reduced by the method according to the present invention.

Moreover, in a method for producing a polymer dispersed liquid crystal complex film and a liquid crystal display device according to the present invention, the polymerization reaction is conducted by irradiating a mixture of a liquid crystal material and a polymerizable material with light having intensities ranging from high to low. The light is obtained by the use of a photomask or the like. Herein, a polymer matrix is formed in a portion of the mixture that is irradiated with light having a high intensity (herein-after referred to as "strongly-irradiated region"), while a liquid crystal region is formed in a portion of the mixture that is irradiated with light having a low intensity (hereinafter referred to as "weakly-irradiated region"). Viewing angle characteristics can be improved by ensuring that the liquid crystal regions correspond to pixel regions.

Moreover, a polymer-matrix type liquid crystal display device according to the present invention uses a mixture of a liquid crystal material and a polymerizable material that are so prescribed as follows: A refractive index $n_p$ of a resultant polymer obtained through polymerization, and an ordinary refractive index $n_o$ and an extraordinary refractive index $n_e$ of the liquid crystal have the following relationship:

$$n_o-0.04 \leq n_p \leq (n_e+n_o)/2$$

As a result, scattering of light is restrained from occurring at interfaces of liquid crystal regions and a polymer matrix of the polymer-matrix type liquid crystal display device.

Thus, the invention described herein makes possible the advantages of (1) providing a liquid crystal device and a method for production thereof, the liquid crystal device having improved heat resistance so as to have a smaller influence on display characteristics of the liquid crystal device, and to have a low driving voltage and excellent display characteristics such as contrast characteristics, voltage-trans mittance hysteresis characteristics, voltage-holding ratio characteristics, and viewing characteristics; and (2) providing a liquid-crystal display device having high display quality in which a displayed image does not have a coarseness problem, and a method for production thereof.

These and other advantages of the present invention will become apparent to those skilled in the art upon reading and understanding the following detailed description with reference to the accompanying figures.

DESCRIPTION OF THE PREFERRED EMBODIMENTS

The present application adopts the following terminology.

Figure 1:
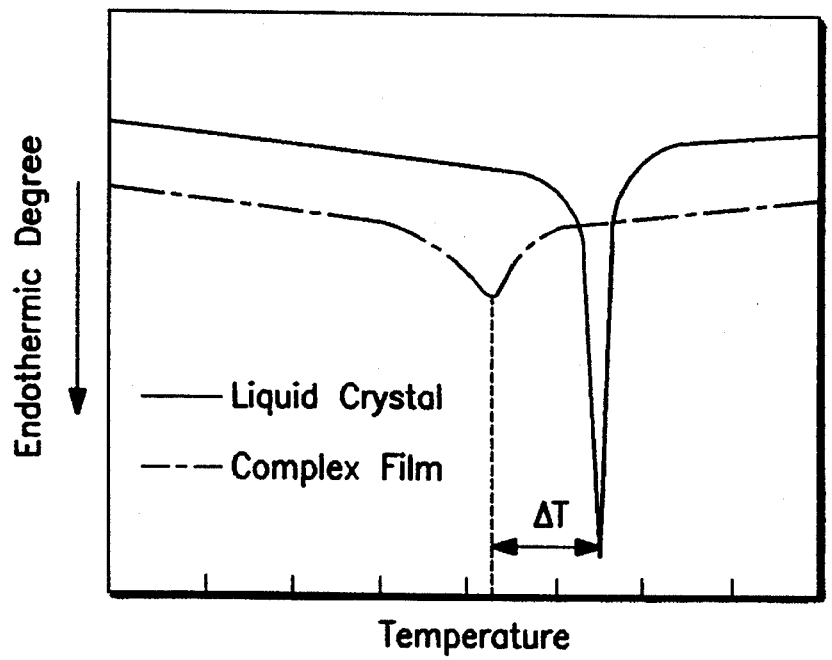
FIG. 1 is a schematic diagram for describing a difference ΔT between phase-transition endothermic peaks of a liquid crystal material and a polymer dispersed liquid crystal complex film.

A phase transition temperature $T_{CI}$ means a transition temperature between a liquid crystal phase and an isotropic liquid phase of a liquid crystal composition in a bulk state, namely a pure liquid crystal composition. A liquid crystal composition means a composition included in a polymer dispersed liquid crystal complex film and a polymer-matrix type liquid crystal display device, and consists essentially of a liquid crystal compound. Strictly speaking, a liquid crystal composition means a system which consists mainly of a plurality of liquid crystal compounds and includes a small amount of a chiral dopant and, if necessary, a coloring substance. A phase transition temperature $T_{matrix}$ means a phase transition temperature of a polymer dispersed liquid crystal complex film obtained by subjecting a mixture of a polymerizable material and a liquid crystal material to a phase separation process conducted through a polymerization reaction. The phase transition temperatures $T_{CI}$ and $T_{matrix}$ correspond to temperatures (°C.) at which an endothermic characteristic curve has a peak, as is shown in FIG. 1. An endothermic degree at a given temperature is measured by a DSC (Differential Scanning Calorimetry) method. The endothermic peak of the complex film arises due to softening and/or glass transition of a liquid crystal composition and a polymer resin composition within the complex film. A polymer resin composition means a composition included in the polymer dispersed liquid crystal complex film and the polymer-matrix type liquid crystal display device, and is a composition mainly containing a polymer (resin) compound, obtained through the phase separation. A value ΔT is defined as an absolute value of a difference between the phase transition temperature $T_{CI}$ between a liquid crystal phase and an isotropic liquid phase and the phase transition temperature $T_{matrix}$ of the complex film.

Figure 2:
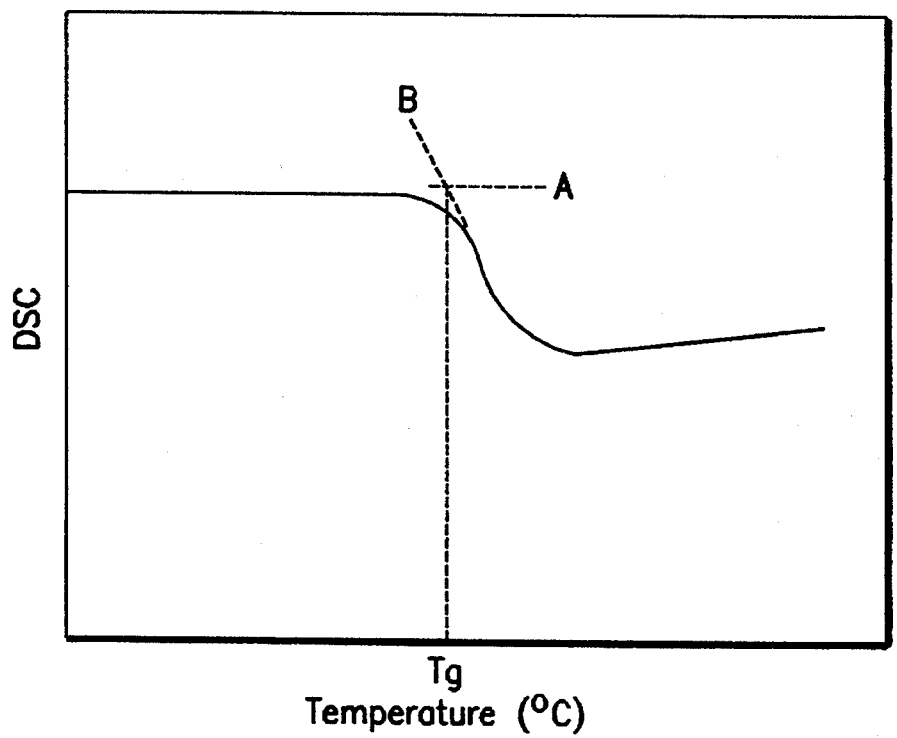
FIG. 2 is a schematic diagram for describing a glass transition temperature $T_g$ of a polymer resin composition.

A glass transition temperature $T_g$ means a glass transition temperature for the polymer resin composition. A glass transition temperature is a value inherent to a given material, and can be evaluated by a DSC method, a viscoelasticity measurement, or the like. In the case of the polymer resin composition according to the present invention, the glass transition temperature $T_g$ thereof is obtained in the following manner: the polymer resin composition, which remains after removing the liquid crystal composition from the polymer dispersed liquid crystal complex film or the polymer-matrix type liquid crystal display device is subjected to a DSC method so as to obtain a characteristic curve of DSC values; the glass transition temperature $T_g$ is defined as a temperature (°C.) at an intersection of asymptotic lines A and B of the curve of DSC values, as is shown in FIG. 2.

The polymer dispersed liquid crystal complex film of the present invention includes the liquid crystal composition and the polymer resin composition The liquid crystal composition forms droplets of liquid crystal in the polymer resin composition. The complex film has a value $\Delta T$ of 25° C. or less and a glass transition temperature $T_g$ of 60° C. or more.

As is described above, in the polymer dispersed liquid crystal complex film of the present invention, thermal characteristics of its components are ensured to fall within a certain range. By doing so, heat resistance characteristics of a liquid crystal panel of a liquid crystal device can be improved.

Firstly, the value $\Delta T$ should be 25° C. or less, and preferably be 10° C. or less. When the value $\Delta T$ is 10° C. or less, a liquid crystal device using this complex film has a sufficiently high response speed in terms of the practicality thereof. It is recognized that an increased amount of the polymer resin composition and the like are mixed within droplets of liquid crystal in the polymer dispersed liquid crystal complex film as the value $\Delta T$ increases. On the other hand, the liquid crystal droplets are more likely to reflect original properties of the liquid crystal composition as the value $\Delta T$ decreases.

The value $\Delta T$ has to do with electrooptical effects of the polymer dispersed liquid crystal complex film, especially the response speed and voltage-transmittance hysteresis characteristics. Moreover, the value $\Delta T$ is important when considering influences of heat resistance characteristics on the electrooptical effects such as the response speed and voltage-transmittance hysteresis characteristics of the polymer dispersed liquid crystal complex film.

"Polymer Preprints, Japan, vol. 38, No. 7, 2154 (1989)" discloses an example of a system whose value $\Delta T$ is small. However, this article does not mention influences of heat resistance characteristics on display characteristics at all.

Secondly, the glass transition temperature $T_g$ should be 60° C. or more, and preferably be 80° to 180° C. The inventors found the following correlation between the value $\Delta T$ and the glass transition temperature $T_g$ of a polymer dispersed liquid crystal complex film: a polymer which has a high glass transition temperature $T_g$ and therefore tends to form a hard matrix is likely to have a small $\Delta T$ value when formed into a complex film. Therefore, by setting the glass transition temperature $T_g$ high, as one method to decrease the value $\Delta T$, heat resistance characteristics of the polymer dispersed liquid crystal complex film can be improved, whereby display characteristics are prevented from deterioration due to certain thermal circumstances.

The above-mentioned polymer dispersed liquid crystal complex film according to the present invention is produced by subjecting the mixture of the polymerizable material and the liquid crystal material to a phase separation process conducted through a polymerization reaction. Herein, the polymerizable material consists essentially of monofunctional monomers and either multifunctional monomers or multifunctional oligomers. In this method, the phase separation process can easily be controlled. Therefore, display characteristics of a resultant complex film are improved, whereby a low voltage operation, rapid electrooptical responses, etc. are realized.

A polymer dispersed liquid crystal complex film having a desirable $\Delta T$ value, namely 10° C. or less, is produced in the following manner: Firstly, as is described above, the mixture is irradiated with light so as to effect a phase separation of the liquid crystal composition and the polymer resin composition. Thereafter, the mixture which has phase-separated is irradiated with light again but at a lower temperature than in the first irradiation.

In this method, as is described above, the mixture which has phase-separated is made to have a lower temperature in the second irradiation of light than in the first irradiation of light. As a result, a portion of the polymerizable material (such as monomers) which remains unreacted, i.e. unpolymerized, and therefore is dissolved in the liquid crystal composition at the first irradiation of light comes out undissolved. By the second irradiation of light, the undissolved (and unreacted) portion of the polymerizable material is polymerized, whereby the unreacted polymerizable material dissolved in the liquid crystal composition decreases in amount. As a result, the value $\Delta T$ can be made 10° C. or less, according to this method.

In this method, the second irradiation should be conducted at, preferably, a temperature lower by 10° C. or more than in the first irradiation, and at a crystallization temperature, or above, of the liquid crystal material included in the liquid crystal composition. When the difference between the temperature at the first irradiation and that at the second irradiation is less than 10° C., the state of phase separation after the second irradiation is not very different from the state of phase separation after the first irradiation. As a result, the amount of the unreacted polymerizable material does not have such a decrease, that is, that effect of the present invention is not attained. When the second irradiation is conducted at the crystallization temperature of the liquid crystal material or below, phase separation is not conducted sufficiently, since movements of materials are not likely to occur. More preferably, in cases where a liquid crystal material having a smectic phase between a nematic phase and an isotropic phase is used, e.g. when ferroelectric liquid crystal is used, the desirable temperature range should be such that the liquid crystal shows a smectic phase. The reason is that liquid crystal is more orderly and less fluid at a smectic phase than at a nematic phase, and therefore is easily oriented, making it easy to conduct phase separation at, in particular, the second irradiation.

As for orientation treatments suitably used in the present invention, for example, an organic film such as that made of polyimide or an inorganic film such as that made of $SiO_2$ can be formed on a surface of a substrate, and if necessary, a rubbing method or the like can suitably be used. Examples of polyimide are SE150 (manufactured by Nissan Chemical Industries Ltd.), Cytop (manufactured by Asahi Glass Co., Ltd.), and the like.

The polymer-matrix type liquid crystal display device of the present invention includes a pair of electrode substrates and a display medium consisting essentially of a complex film interposed therebetween, The display medium includes the liquid crystal composition and the polymer resin composition. The liquid crystal composition forms liquid crystal regions that correspond to pixel regions, and is supported by a polymer matrix consisting of the polymer composition. Liquid crystal domains are oriented either radially or randomly in each liquid crystal region. This display medium has a value $\Delta T$ of 25° C. or less, and a glass transition temperature of 50° C. or more.

Figure 3A:
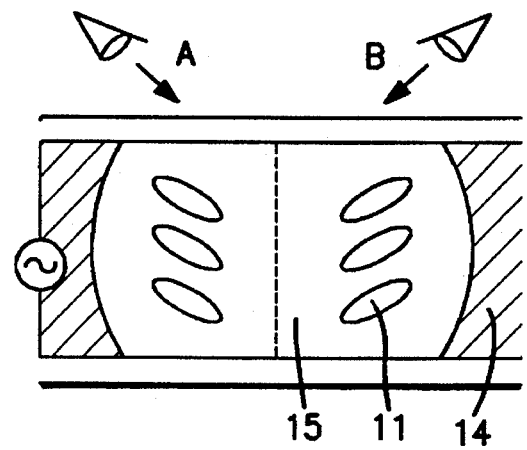
FIG. 3A is a cross-sectional view of a liquid crystal display device according to the present invention in a state where an intermediate gray tone is displayed, and it describes improvement of viewing angle characteristics of the device.
Figure 3B:
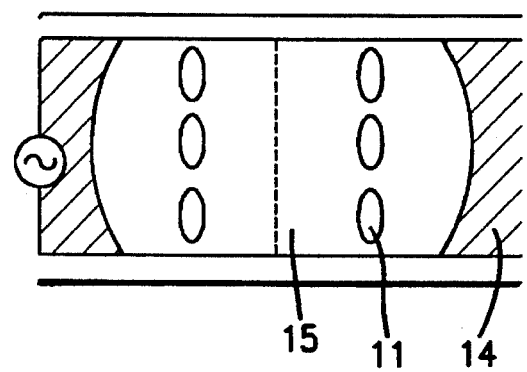
FIG. 3B is a cross-sectional view of a liquid crystal display device according to the present invention when being transparent, and it describes improvement of viewing angle characteristics of the device.

This complex film has excellent viewing angle characteristics, and the reason therefor will be described with reference to FIGS. 3A and 3B. FIGS. 3A and 3B are cross-sectional views of a liquid crystal display device in which the above-mentioned display medium is used. FIG. 3A describes a state where an intermediate gray tone is displayed, while FIG. 3B describes a state where the display medium is transparent.

In a transparent state, as is shown in FIG. 3B, each liquid crystal molecule 11 has the same apparent refractive index, irrespective of the viewing angle, as in a conventional display medium. However, in a state where the display medium is displaying an intermediate gray tone, as is shown in FIG. 3A, the liquid crystal molecules 11 stand omnidirectionally when a voltage is applied to the display medium so that an intermediate gray tone is displayed, since the liquid crystal domains are oriented either radially or randomly in a liquid crystal region 15 surrounded by a polymer matrix 14. Thus, the liquid crystal molecules 11, as observed from a direction A, stand at the same angle as in cases where they are observed from a direction B. In other words, the apparent refractive index of liquid crystal molecules 11 as a whole does not depend on the viewing angle, whereby the viewing angle characteristics are improved.

Moreover, the value ΔT and the glass transition temperature $T_g$ of this display medium are to be set within a similar range to those prescribed for the above-mentioned complex film. Therefore, this display medium (complex film) has as good display characteristics and heat resistance characteristics as the complex film mentioned earlier does.

An example of a method for producing a liquid crystal display device in which such a display medium is used will be described, with reference to FIGS. 4A and 4B.

Figure 4A:
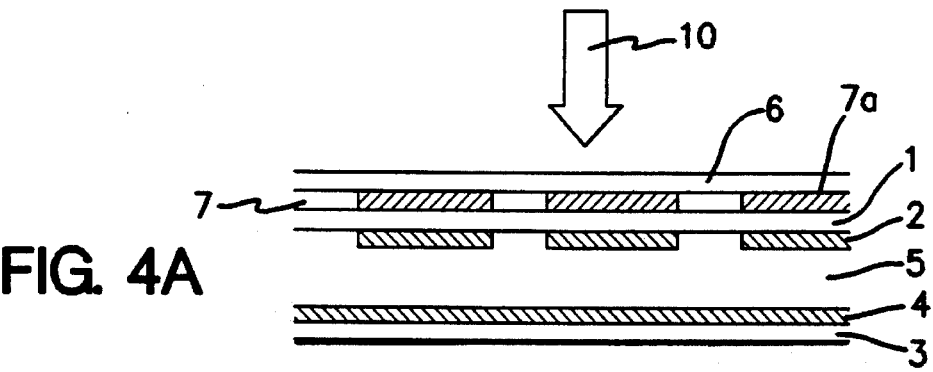
FIG. 4A is a schematic cross-sectional view of a liquid crystal display device when produced by a method according to the present invention, and it shows a state before the device is irradiated with light.
Figure 4B:
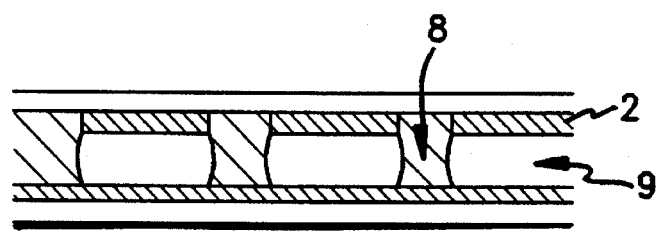
FIG. 4B is a schematic cross-sectional view of a liquid crystal display device when produced by a method according to the present invention, and it shows a state after the device is irradiated with light.

First, as is shown in FIG. 4A, substrates 1 and 3 are disposed so as to oppose each other. On the substrate 1, strip-shaped electrodes 2 are formed so as to be parallel to one another. On the substrate 3, strip-shaped electrodes 4 are formed so as to be parallel to one another. Between the substrates 1 and 3, a mixture 5 of a polymerizable material and a liquid crystal material is sealed. The polymerizable material consists essentially of monofunctional monomers and at least one of multifunctional monomers and multifunctional oligomers. Herein, each strip-shaped electrode 2 and each strip-shaped electrode 4 are perpendicular to each other. The mixture 5 may include a polymerization initiator, as will be described later.

Next, a glass plate 6, on which a photomask 7 is formed, is disposed on the substrate 1. Then, the mixture 5 is irradiated with UV (Ultra Violet)-rays 10 through the photomask 7. The photomask 7 is formed so as to have masking portions 7a corresponding to pixel regions of the liquid crystal display device. This makes possible an irradiation of the mixture 5 with UV-rays having a distribution of intensities with substantially identical regularity with that of desired liquid crystal regions (pixels). In a portion of the mixture 5 where UV-rays are radiated, namely a portion excluding the pixel regions, polymerization occurs rapidly. Therefore, the phase separation rate of the liquid crystal composition and the polymer resin composition is high, so That a polymer that has deposited thrusts the liquid crystal to a portion which is masked by the masking portion 7a, where the UV-rays have a low intensity. At the same time, the polymerizable material (and the polymerization initiator) gathers at a portion where polymerization is taking place, owing to a concentration gradient. As a result, as is shown in FIG. 4B, a polymer matrix 8 and liquid crystal regions 9 are clearly separated, the liquid crystal regions 9 being uniformly formed and regularly arranged so as to be on a plane.

In the steps of where irradiation with UV-rays is conducted, if the mixture of The liquid crystal material and the polymerizable material is polymerized in a liquid crystal state, an orientation of the mixture is strongly controlled by a substrate, since a resultant polymer is also in a liquid crystal state. Herein, suitable liquid crystal phases are a nematic phase and a smectic phase. In view of movements of materials such as the polymerizable material at the irradiation with UV-rays, a nematic phase is preferable because of the high fluidity thereof.

In this method as well, an orientation treatment can be conducted by forming an organic film or an inorganic film on a surface of at least one of the substrates, and if necessary, a rubbing method or the like can be suitably used. Conducting an orientation treatment improves orientational regularity of the liquid crystal domains, insulating properties, and adhesion between the display device and the substrates.

In a case where, as in the present method, a mixture of a liquid crystal material and a photopolymerizable material is irradiated with light having intensities ranging from high to low, a thin polymer film may occasionally be left on a surface of a substrate even in liquid crystal regions thereof. In this case, an orientation film formed on the substrate does not exercise a strong orientation control over the liquid crystal regions. As a result, liquid crystal domains in each liquid crystal region are oriented radially or randomly.

In a case where a vertical orientation film is used, which has a strong orientation control over liquid crystal regions, liquid crystal molecules stand vertically with respect to a substrate, thus constituting a homeotropic orientation. In this case, because of an interaction between the liquid crystal molecules and a polymer matrix, the liquid crystal molecules stand in parallel with the substrate when a voltage is applied. As a result, the refractive index of each liquid crystal molecule becomes substantially the same irrespective of the viewing angle, whereby viewing angle characteristics are improved.

It was confirmed that, in cases where a material having a strong orientation property such as ferroelectric liquid crystal is used, orientation of the liquid crystal regions can be conducted in accordance with an orientation of the substrate even by the present method where the orientation control is weakened.

In the present method, in order to ensure that the pixel regions and the liquid crystal regions correspond to each other, it is important to acquire UV-rays having a distribution of intensities ranging from high to low. Other light regulating means can be used in place of a photomask. For example, a microlens array, an interfering plate, etc. are preferable in that they are capable of forming a regular distribution of UV-ray intensities.

In a case where a photomask is used, the photomask can be provided on either the inside or outside of a substrate, as long as a regular distribution of UV-ray intensities is obtained. The photomask should preferably be as close to the mixture of the liquid crystal material and the polymerizable material as possible. If the distance between the substrate and the photomask is made large, a portion of the mixture that is actually irradiated with the UV-ray is blurred, therefore reducing the effect of the present invention. Herein, UV-rays to be used should preferably be parallel rays.

However, in cases where ferroelectric liquid crystal is used as the liquid crystal material, light with a slightly poorer degree of parallelism can be used. The reason is that, in the case of ferroelectric liquid crystal, shock resistance of the complex film should be improved, and therefore it is effective to provide smaller liquid crystal droplets as buffers at the periphery of each liquid crystal region. Instead of using light with a slightly poorer degree of parallelism, a light regulating means (such as a photomask) having a blurred end portion can be used. Alternatively, the photomask can also be placed at a distance from the mixture.

Regarding portions of the light regulating means (such as a photomask) for respectively forming a strongly-irradiated region and weakly-irradiated regions of the mixture, a study by the inventors revealed the following. In the case of a mode which does not utilize scattering of light between a polymer resin composition and a liquid crystal composition, e.g. a non-scattering mode used in the present example, it is preferable that the size of each portion of the light regulating means for forming a weakly-irradiated region (hereinafter, this portion will be referred to as a 'masking portion') accounts for 30% or more of the area of each pixel. If, on the contrary, the size of each masking portion of the light regulating means is less than 30% of the area of each pixel, the size of a resultant liquid crystal region is also less than 30% of the area of each pixel; this means that a number of interfaces between a liquid crystal region and the polymer matrix are present in one pixel region, so that the contrast of the liquid crystal device lowers because of light scattering. Such a liquid crystal device is not practical. More preferably, a photomask or the like which allows the UV-ray to be radiated exclusively on portions of the mixture excluding the pixel regions should be used. In this case, the number of interfaces between a liquid crystal region and the polymer matrix which are present in one pixel region becomes extremely small. As a result, the intensity of scattering of light in the pixel region decreases, whereby the contrast of the liquid crystal device can be improved.

Each masking portion can have any shape as long as the intensity of the UV-ray Is locally lowered in 30% or more of the area of each pixel region. For example, the configuration of each masking portion can be a circle, a square, a trapezoid, a hexagon, a rectangle, a diamond shape, a letter, or a shape surrounded by a curved line(s) and/or a straight line(s). A configuration obtained by cutting a part off these shapes, a configuration obtained by combining different shapes, a configuration obtained by combining the same shape, and the like can also be used. However, the shape of each masking portion is not limited to those which are listed above. When the present invention is put to practical use, one or more of these shapes are to be selected. In order to improve uniformity of the liquid crystal regions, it is preferred to limit the configuration to one shape with one size.

Figure 5A:
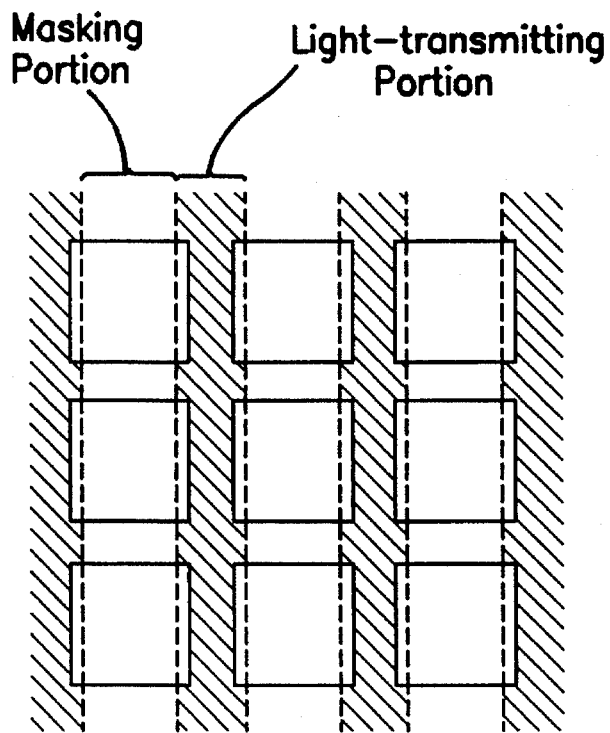
FIGS. 5A and 5B are views showing patterns of a photomask used in production of a liquid crystal display device according to the present invention.
Figure 5B:
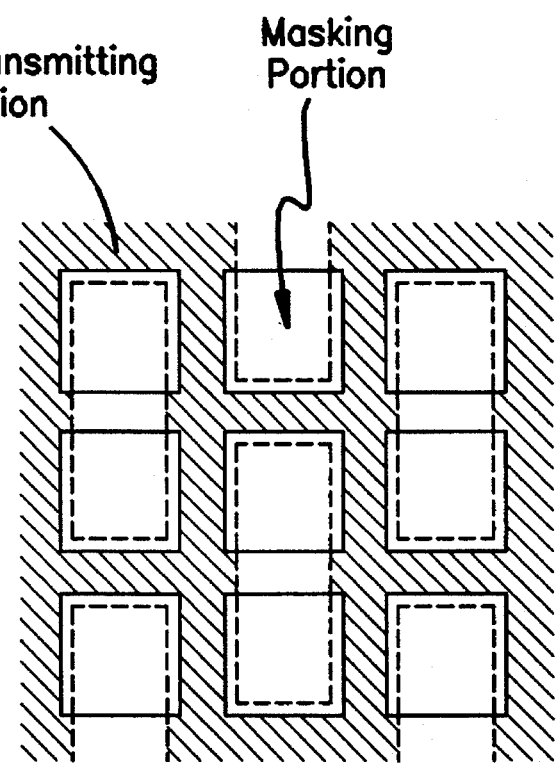

Moreover, one masking portion can be provided for more than one pixel. For example, as is shown in FIG. 5A, each masking portion can be provided for a row consisting of more than one pixel, or as is shown in FIG. 5B, for a group consisting of more than one pixel. Furthermore, the masking portions do not need to be independent from one another, but can be connected to one another at an end portion, as long as portions intercepting the UV-rays most effectively have one or more of the above-mentioned configurations and/or arrangements. Preferably, the pitch of each liquid crystal region is made equal to that of each pixel region, whereby one liquid crystal region is provided for each pixel region.

In this method as well, a polymer dispersed liquid crystal complex film having a desirable ΔT value, namely 10° C. or less, can be obtained by irradiating the mixture of the liquid crystal material and the polymerizable material with light so as to effect a phase separation, and further irradiating the mixture, which has phase-separated, with light but at a lower temperature than in the first irradiation. Herein, in order to protect the liquid crystal composition and to have better control of the configurations of the liquid crystal regions, a light regulating means such as a photomask should be used at the second irradiation as well as at the first irradiation.

Such a polymer-matrix type liquid crystal display device, however, has the problem of low contrast. Above all, a displayed image has a coarse appearance, as has been described earlier. In order to solve this problem, a study was conducted by the inventors of the present invention. The study revealed that a liquid crystal display device having excellent viewing angle characteristics can be realized by using a mixture of a liquid crystal material and a polymerizable material which meet the following relationship, regarding a refractive index $n_p$ of a resultant polymer obtained through polymerization, and an ordinary refractive index $n_o$ and an extraordinary refractive index $n_e$ of the liquid crystal:

$$n_o - 0.04 \leq n_p \leq (n_e + n_o)/2$$

It was confirmed that a liquid crystal display device having excellent display quality can be obtained by using such a mixture and selectively controlling the distribution of liquid crystal regions and a polymer matrix through a phase separation process.

Hereinafter, the present invention will be further described, regarding the above-mentioned effect.

A liquid crystal display device according to the present invention includes a plurality of pixels partitioned by a polymer matrix. Each pixel has one or more liquid crystal domain. In cases where each pixel has a plurality of liquid crystal domains, it is preferable that the liquid crystal domains have different orientations from one another. In cases where each pixel has one liquid crystal domain (i.e. in 'monodomain' cases), the liquid crystal panel as a whole includes liquid crystal domains having different orientations from one another. In other words, the whole liquid crystal panel includes liquid crystal domains having different orientations from one another in both cases. Moreover, in monodomain cases, each pixel has no disclination lines, which would usually appear as bright streaks that are disadvantageous to the display characteristics of the display device. Therefore, the contrast of such a monodomain liquid crystal display device is improved.

When a voltage is applied to the liquid crystal display device (monodomain or otherwise), liquid crystal molecules in each liquid crystal region stand vertically with respect to substrates; therefore each liquid crystal molecule has a refractive index $n_o$. When no voltage is applied, the liquid crystal molecules are oriented so as to be parallel to the substrates; therefore, each liquid crystal molecule has a refractive index $(n_e + n_o)/2$ with respect to light incident thereto. A main objective of the present invention is to improve the contrast of the liquid crystal display device and especially to minimize the coarseness problem of a displayed image by restraining the scattering of light occuring due to a difference in refractive indices of the liquid crystal and the polymer matrix. This objective is met by ensuring that a refractive index $n_p$ of the polymer falls within a range between the ordinary refractive index $n_o$ of each liquid crystal molecule and the refractive index $(n_e + n_o)/2$ of each liquid crystal molecule in a randomly oriented state, so as to minimize the difference in the refractive indices of the liquid crystal and the polymer. Herein, however, it was confirmed by a study by the inventors that the above-mentioned objective of improving the contrast of the display device can be met as long as the difference between the refractive index $n_p$ of the polymer and the ordinary refractive index $n_o$ of each liquid crystal molecule is 0.04 or less. Hereinafter, this effect of improvement of contrast will be described with reference to FIG. 17.

Figure 17:
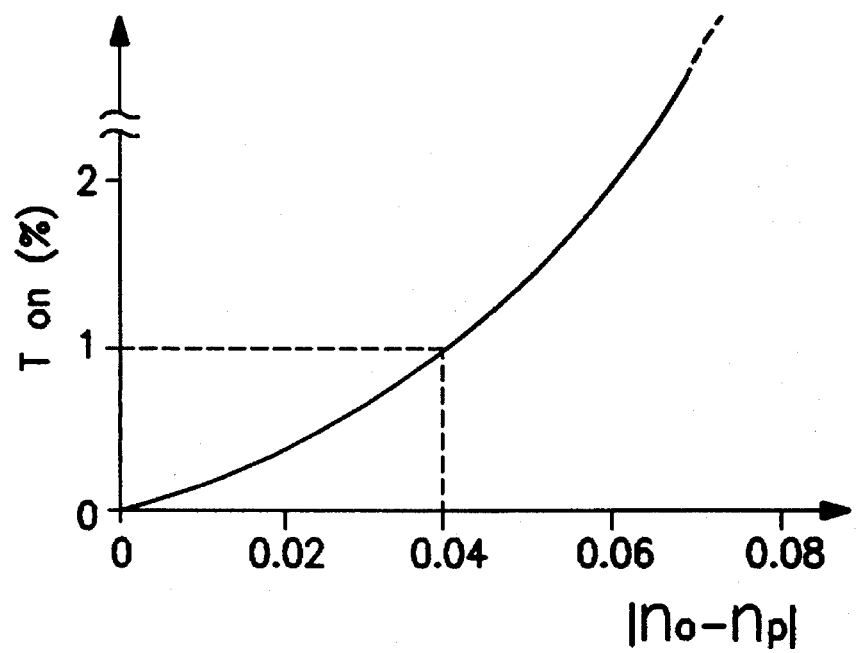
FIG. 17 is a graph showing the relationship between a transmittance $T_{ON}$ of a liquid crystal cell when a voltage is applied thereto and the absolute value of a difference between an ordinary refractive index $n_o$ of liquid crystal and a refractive index $n_p$ of a polymer.
Figure 16A:
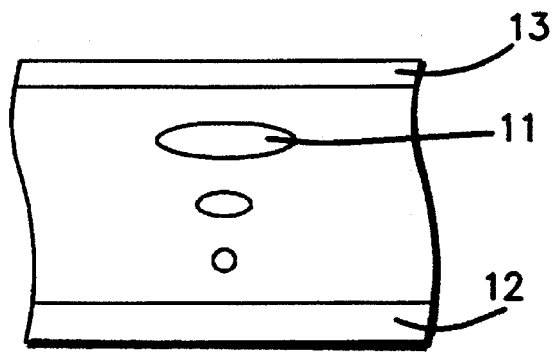
FIG. 16A is a cross-sectional view of a conventional liquid crystal display device of a TN type in an initial state, and it describes improvement of the viewing angle characteristics of the device.
Figure 16B:
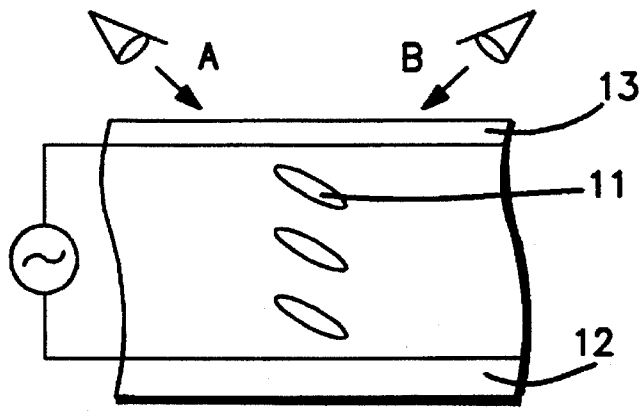
FIG. 16B is a cross-sectional view of a conventional liquid crystal display device of a TN type in a state where an intermediate gray tone is displayed, and it describes improvement of the viewing angle characteristics of the device.
Figure 16C:
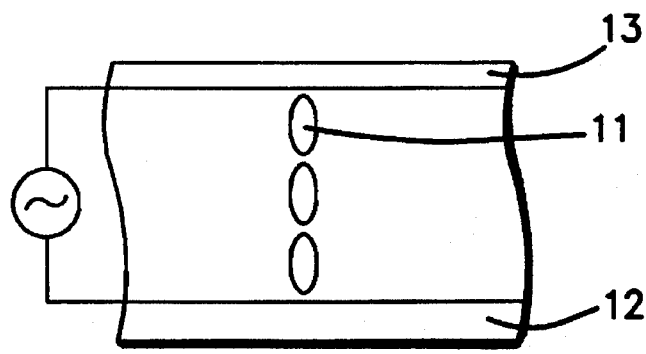
FIG. 16C is a cross-sectional view of a conventional liquid crystal display device of a TN type when transparent, and it describes improvement of the viewing angle characteristics of the; device.

When a contrast ratio CR is defined as a ratio of a transmittance $T_{OFF}$ under no voltage applied to a transmittance $T_{ON}$ under a voltage applied (i.e. when $CR=T_{OFF}/T_{ON}$), it is very effective to reduce the transmittance $T_{ON}$ in order to improve the contrast of the liquid crystal display device. Therefore, the inventors examined how the transmittance $T_{ON}$ is affected when the refractive index $n_p$ of the polymer is varied in the vicinity of the ordinary refractive index $n_o$ of each liquid crystal molecule. FIG. 17 illustrates the results of the above examination. As is seen from FIG. 17, the transmittance $T_{ON}$ under a voltage applied decreases as the difference between the refractive index $n_p$ of the polymer and the ordinary refractive index $n_o$ of each liquid crystal molecule decreases. When the value $|n_o-n_p|$ is 0.04 or less, the transmittance $T_{ON}$ is 1% or less; accordingly, the contrast ratio CR as defined above is greatly increased. On the other hand, when the value $|n_o-n_p|$ is more than 0.04, the transmittance $T_{ON}$ is more than 1%; accordingly, the contrast ratio CR decreases.

Figure 15:
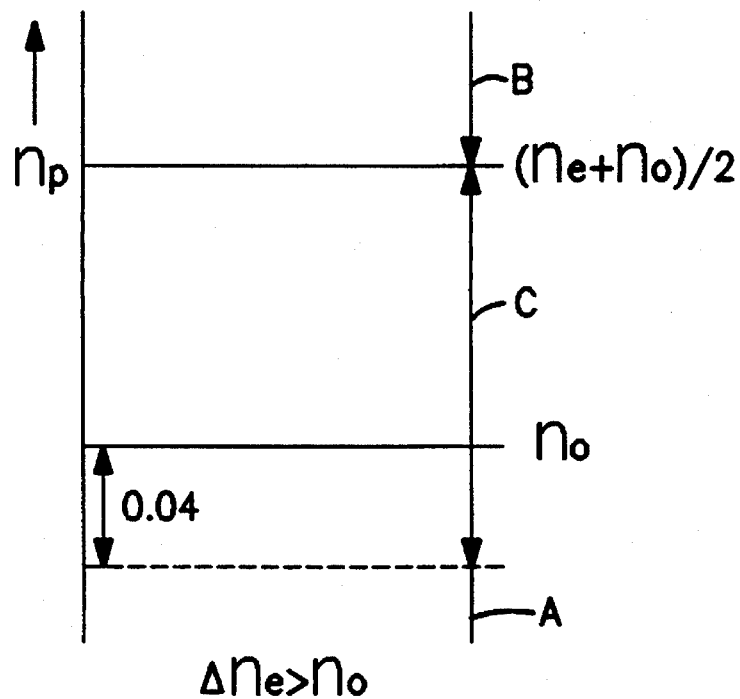
FIG. 15 is a diagram for describing a range of-refractive indices in Example 18.

As for the range of the difference in the refractive indices of the liquid crystal and the polymer, the following facts are observed, with reference to FIG. 15:

(A) When the refractive index $n_p$ of the polymer is smaller than [the ordinary refractive index $n_o$ of the liquid crystal—0.04], the refractive index $n_p$ and the refractive index $(n_e+n_o)/2$ of the liquid crystal in a randomly oriented state have a large difference. Therefore, the coarseness problem when no voltage is applied worsens.

(B) When the refractive index $n_p$ of the polymer matrix is larger than the refractive index $(n_e+n_o)/2$ of the liquid crystal in a randomly oriented state, the refractive index $n_p$ and the ordinary refractive index $n_o$ of the liquid crystal have a large difference. Therefore, the coarseness problem when a voltage is applied worsens.

(C) By ensuring that the refractive index $n_p$ of the polymer matrix is in a range between [the ordinary refractive index $n_o$ of the liquid crystal—0.04] and the refractive index $(n_e+n_o)/2$ of the liquid crystal in a randomly oriented state, the difference between the refractive index of the liquid crystal and that of the polymer matrix (i.e. $n_p$) can be made small in both of i) cases where a voltage is applied (that is to say, the difference between the ordinary refractive index $n_o$ of the liquid crystal and the refractive index $n_p$ of the polymer matrix is small) and ii) cases where no voltage is applied (that is to say, the difference between the refractive index $(n_e+n_o)/2$ of the liquid crystal in a randomly oriented state and the refractive index $n_p$ of the polymer matrix is small).

Moreover, the difference between the refractive index of the liquid crystal and that of the polymer matrix can be made to vary within only a small range in spite of changes in voltage between a state where a voltage is applied and a state where no voltage is applied.

Thus, the contrast of the liquid crystal display device is improved, and the coarseness problem of a displayed image can be minimized.

Hereinafter, the polymerizable material and the liquid crystal material to be used in the present invention will be described.

First, the polymerizable material, which is polymerized to form the polymer resin composition, will be described. The polymer polymerizable material is a precursor for forming the polymer dispersed liquid crystal complex film and the above-mentioned liquid crystal display device, and can be a photopolymerizable material, a thermosetting material, or the like. In the case of a photopolymerizable material, for example, it is a photopolymerizable one of mixtures including a monofunctional monomer and at least one of a multifunctional monomer and an oligomer thereof; and occasionally a polymerizable fluorine-containing resin compound, a polymerizable chlorine-containing resin compound, and/or a polymerizable silicon-containing resin compound. The mixture may, if necessary, further include one or more surfactants.

The polymerizable material as cited herein means a substance including a compound whose molecules include a reactive double bond and/or a functional group such as an epoxy group. In particular, a photopolymerizable material means a substance including an acrylate monomer (oligomer), methacrylate monomer (oligomer), or the like. It is very effective to ensure that, in order to raise the glass transition temperature $T_g$ of the polymer composition so as to form a hard matrix and in order also to realize a high voltage-holding ratio, the substance includes a resin compound containing fluorine, chlorine, or silicon.

Herein, an example mixing ratio of the monofunctional monomer to the multifunctional monomer and oligomer in the polymerizable material to be used in the present invention is, by weight, 93:7 to 40:60. Moreover, a glass transition temperature $T_g$ of a polymer obtained by polymerizing and curing such a polymerizable material should be 60° C. or more, and more preferably, in the range of 80° C. to 180° C. If the monofunctional monomer accounts for a larger portion in the mixing ratio of the polymerizable material, physical strength of a resultant polymer matrix is not sufficient in terms of practicality. Moreover, the diameters of the dispersed liquid crystal grains increase because a sufficient polymerization/phase separation rate cannot be obtained. Therefore, contrast of the liquid crystal device lowers considerably. If the monofunctional monomer accounts for a smaller portion than the prescribed range, on the other hand, compatibility of the liquid crystal composition and the polymer resin composition lowers, making it difficult to produce a polymer dispersed liquid crystal display device capable of operating at a low voltage.

In a case where a polymerizable fluorine-containing resin compound, a polymerizable chlorine-containing resin compound, a polymerizable silicon-containing resin compound, and/or a surfactant is added to the polymerizable material, those compounds should account for, by weight, 1% to 50% of the polymerizable material, and more preferably, 5% to 40% of the polymerizable material. Herein, if the polymerizable fluorine-containing resin compound, polymerizable chlorine-containing resin compound, and polymerizable silicon-containing resin compound account for a smaller portion of the polymerizable material than the above, the superficial energy of a resultant polymer is not sufficiently low. If these polymerizable compounds account for a larger portion, on the other hand, it becomes difficult to obtain a homogeneous mixture of the liquid crystal material and the polymerizable material. As a result, a uniformly-formed polymer dispersed liquid crystal complex film cannot be obtained, and the glass transition temperature $T_g$ of the polymer included in the complex film or the polymer-matrix type display device decreases.

Transparent fluorine-containing compound, chlorine-containing compound, and silicon-containing compound to be used should have only a small degree of polarization and generate few ions. They should be chemically inactive, and have excellent dielectric characteristics and relatively high insulative property. In this case, the superficial energy of a resultant polymer is lowered so that an interaction at an interface between the liquid crystal and the polymer is reduced, whereby the response speed of the liquid crystal device is improved, and the voltage-transmittance hysteresis thereof is reduced.

In the case of a photopolymerizable material, the glass transition temperature $T_g$ of the monofunctional monomer to be mixed with a fluorine monomer, a chlorine monomer, and/or a silicon monomer should be 10° C. or more, and more preferably, 30° C. or more.

However, even in the case where a monofunctional monomer whose glass transition temperature $T_g$ is in the vicinity of 0° C. is used, by adding a multifunctional and/or monomer or oligomer, the glass transition temperature $T_g$ of a resultant polymer can be raised to 60° C. or more. However again, in the case of a resin compound whose glass transition temperature $T_g$ is 10° C. or less, this effect of improving the glass transition temperature $T_g$ of a resultant polymer is reduced.

As for the multifunctional monomer and multi-functional oligomer to be used., those having a glass transition temperature $T_g$ of at least 60° C. or more are preferable. This multifunctional monomer, as compared with the monofunctional oligomer, has an effect of lowering the temperature at which it is compatible with the liquid crystal, and the molecular weight thereof should be 1000 or less. The more functional groups the multifunctional monomer has, the more it raises the glass transition temperature $T_g$.

Moreover, a multifunctional monomer and a multifunctional oligomer have a number of reactive cites in polymerization reactions and therefore tend to form a polymer matrix having a harder three-dimensional net structure. As a result, a small amount of impurities which may possibly remain after production of the polymer dispersed liquid crystal complex film are prevented from moving, whereby the voltage-holding ratio of the liquid crystal display device is raised.

Hereinafter, examples of polymerizable materials (monofunctional monomers, multifunctional monomers and multifunctional oligomers) to be used so that the value ΔT falls within the above-prescribed range, and formulas of fluorine-containing resin compounds, chlorine-containing compounds, or silicon-containing compounds, which may be further added in order to improve display characteristics of the liquid crystal device, will be described.

A case will be described where a photopolymerizable material is used.

Examples of monofunctional monomers are: cyclohexyl acrylate (Tg: 16° C.), dicyclopentenyloxyethyl acrylate ($T_g$: 12° C.), tetrahydrofurfuryl acrylate ($T_g$: 60° C.), dicyclopentenyl acrylate ($T_g$: 95° C.), isobornyl acrylate ($T_g$: 90° to 100° C.), t-butylaminoethyl methacrylate (Tg: 33° C.), dicyclopentenyloxyethyl methacrylate ($T_g$: 30° C.), stearyl methacrylate ($T_g$: 38° C.), glycidyl methacrylate ($T_g$: 41° C.), 2-hydroxyethyl methacrylate ($T_g$: 55° C.), cyclohexylmethacrylate ($T_g$: 66° C.), isobornyl methacrylate ($T_g$: 170° C.), and the like.

Examples of multifunctional monomers are: neopentylglycol diacrylate ($T_g$: 70° C.), hisphenol A diethoxy diacrylate ($T_g$: 75° C.), tripropyleneglycol diacrylate ($T_g$: 90° C.), propoxytrimethylolpropane tryacrylate ($T_g$: 120° C.), pentaerythritol triacrylate ($T_g$: >250° C.), trimethylolpropane triacrylate ($T_g$: >250° C.), dipentaerythritol hexaacrylate ($T_g$: >250° C.), and the like.

Examples of fluorine-containing resin compounds are those which are represented by the following Formula I:

(wherein $R_1$ represents H or $CH_3$; $R_2$ represents $C_{n1}F_{2n1+1}$; n1 is an integer of 1 to 5; and m1 is an integer of 1 to 21.)

Examples of chlorine-containing resin compounds are those which are represented by the following Formula II:

(wherein $R_3$ represents H or $CH_3$; $R_4$ represents $C_{n2}Cl_{2n2+1}$; n2 is an integer of 1 to 5; and m2 is an integer of 1 to 21.)

Examples of silicon-containing compounds are those which are represented by the following Formula III:

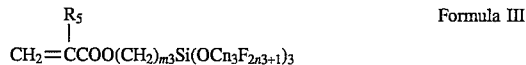

(wherein $R_5$ represents H or $CH_3$; n3 is an integer of 1 to 5; and m3 is an integer of 1 to 10), or those which are represented by the following Formula IV:

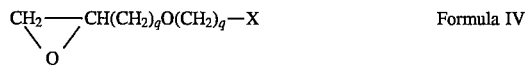

(wherein X represents $Si(OC_sH_{2s+1})_3$, $Si-CH_3(OC_sH_{2s+1})_2$, or $Si-(CH_3)_2OC_sH_{2s+1}$; q is an integer of 1 to 5; and s is an integer of 1 to 3). More specifically, there are vinylalkoxysilane compounds such as vinyltris (β-methoxyethoxy)silane, vinyltriethoxysilane, and vinyltrimethoxysilane.

A polymer material to form a polymer resin composition used in the present example is required to have high stability against heat and high electric resistance characteristics. In particular, in cases where the polymer dispersed liquid crystal complex film is used for a liquid crystal display device and is driven by an active matrix system such as that using a TFT (Thin Film Transistor), it is necessary for the liquid crystal display device to have excellent voltage-holding ratio characteristics. This requires, however, that the polymer material is sufficiently refined so as to have a specific resistance of $10^{12}$ Ω.cm or more. As for a photopolymerizable material, for example, an acrylic acid and an acrylic acid ester having a benzene ring or a long-chain alkyl group having three or more carbons can be used.

More specifically, besides the above-mentioned compounds, isobutyl acrylate, stearyl acrylate, lauryl acrylate, isoamyl acrylate, n-butylmethacrylate, n-lauryl methacrylate, tridecyl methacrylate, 2-ethylhexyl acrylate, benzyl methacrylate, 2-phenoxyethyl methacrylate, and the like can be used.

In order to increase the physical strength of the resultant polymer resin composition, multi-functional compounds having two or more functional groups, such as bisphenol A dimethacrylate, bisphenol A diacrylate, 1,4-butanediol dimethacrylate, 1,6-hexanediol dimethacrylate, trimethylol propane trimethacrylate, tetramethylolmethane tetraacrylate, and neopentyl diacrylate, can be used.

More preferably, compounds obtained by halogenating, in particular by chlorinating or fluorinating, some of the above-mentioned monomers can be used Examples of such compounds include 2,2,3,4,4,4-hexaphlorobutyl methacrylate; 2,2,3,4,4,4-hexachlorobutyl methacrylate; 2,2,3,3-tetraphloropropyl methacrylate; 2,2,3,3- tetraphloropropyl methacrylate; perphlorooctyl methacrylate; perchlorooctylethyl methacrylate; perphlorooctylethyl acrylate; and perchlorooctylethyl acrylate.

When a photomask is used, in order to form liquid crystal regions in accordance with configurations of masking portions of the photomask, it is preferable to add a substance for restraining the polymerization reaction to the above-mentioned polymerizable materials. Such substances are, more specifically, monomers or compounds, etc. which stabilize a radical by a resonance system after the radical has been produced. For example, there are styrene, p-chlorostyrene, p-methylstyrene, p-phenyl styrene, 4-vinylnaphthalene, nitrobenzene, and the like.

Hereinafter, the liquid crystal material included in the liquid crystal composition of the present invention, will be described.

The liquid crystal used in the present invention is an organic compound or organic mixture which is generally in liquid crystal state in the vicinity of room temperature, and includes nematic liquid crystal (including liquid crystal for double channel drive and liquid crystal whose anisotropy $\Delta\epsilon$ of dielectric constant is less than 0), cholesteric liquid crystal, smectic liquid crystal, ferroelectric liquid crystal, discotic liquid crystal, and the like. These liquid crystal materials may be a mixture of two or more kinds of liquid crystal compounds. It is possible to construct a guest-host mode liquid crystal display device using such a liquid crystal material with one or more kinds of dichroic dyes further included therein. Herein, in terms of compatibility, it is also preferable to use, as the polymerizable material, a compound in which a liquid-crystallinity exhibiting portion is introduced to a polymerizable functional group, which serves as a polymerizable liquid crystal prepolymer. In that case, use of liquid crystal materials containing fluorine or chlorine requires that the liquid crystal compound having a polymerizable functional group also contains fluorine or chlorine, because of idiosyncratic chemical circumstances pertaining to the liquid crystal materials containing fluorine or chlorine. In cases where ferroelectric liquid crystal is used, it is also preferable to use a polymerizable liquid crystal prepolymer in order to form a stable smectic phase.

Examples of polymerizable functional groups are functional groups such as acryloyl, methacryloyl, and epoxy (glycidyl)groups. Examples of such polymerizable liquid crystal prepolymers are disclosed in Japanese Laid-Open Patent Publication Nos. 62-277412, 63-264629, 63-280742, and the like. Such liquid crystal prepolymers can be added to the liquid crystal material unless they undermine display characteristics of the liquid crystal display device.

A polymerizable liquid crystal prepolymer means, though the present invention intends to provide no limitations thereto, such a compound as represented by the following Formula V, and is a compound which is not likely to affect liquid crystallinity of host liquid crystal molecules.

A-B-LC            Formula V

In Formula V, A represents a polymerizable functional group. Examples thereof include functional groups having unsaturated bonds such as $CH_2=CH-$, $CH_2=CH-COO-$, $CH_2=C(CH_3)-COO-$, and $-N=C=O$, and functional groups having a heterocyclic structure with strain such as a structure represented by the following Formula VI.

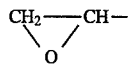
Formula VI

B represents a coupling group connecting the polymerizable functional group to the liquid crystal-line compound. Examples thereof include an alkyl chain ($-(CH_2)_n-$), an ester bond ($-COO-$), an ether bond ($-O-$), a polyethylene glycol chain ($-CH_2CH_2O-$), and other coupling groups obtained by combining these coupling groups. In particular, in order that the compound represented by Formula V shows liquid crystallinity when mixed with the liquid crystal material, a coupling group having 6 or more bonds from the polymerizable functional group to the fixed portion of the liquid crystal molecules is preferred.

LC represents a liquid crystalline compound. Examples thereof include a compound represented by the following Formula VII, a cholesterol ring, and derivatives thereof.

D-E-G            Formula VII

In Formula VII, D represents a functional group capable of being bound to the coupling group represented by the letter B, and has a function of influencing the value of anisotropy of dielectric constant of the liquid crystal molecules and that of the anisotropy of refractive index. Examples thereof include a paraphenyl ring, a 1,10-diphenyl ring, a 1,4-cyclohexane ring, a 1,10-phenylcyclohexane ring, a naphthalene ring, and a tarphenyl ring. G represents a polar group which causes the anisotropy of dielectric constant, etc. of the liquid crystal to be exhibited. Examples thereof include a benzene ring, a cyclohexane ring, a para-diphenyl ring, and a phenylcyclohexane ring, each having a functional group such as $-CN$, $-OCH_3$, $-F$, $-Cl$, $-OCF_3$, $-OCCl_3$, $-H$, $-R$ (R: alkyl group). E represents a functional group connecting D to G. Examples thereof include a single bond, $-CH_2-$, $-CH_2CH_2-$, $-O-$, $-C\equiv C-$, and $-CH=CH-$.

The liquid crystal material and the polymerizable material should preferably constitute a ratio in the range of, by weight, 50:50 to 93:7, and more preferably, 70:30 to 90:10, when mixed together. If the liquid crystal material accounts for less than 50%, the polymer matrix has more influence, so that the driving voltage of the liquid crystal device becomes extremely large, therefore ruining practicality of the liquid crystal device. If the liquid crystal accounts for more than 93%, on the other hand, the physical strength of the polymer matrix lowers, so that the liquid crystal device cannot have stable performance.

Moreover, in cases where a compound having liquid-crystallinity and a polymerizable material having no liquid-crystallinity are mixed to form the polymer material, the compound having liquid-crystallinity should account for 0.5% or more of the polymerizable material. Herein, the polymer material as a whole (consisting of the compound having liquid-crystallinity and the polymerizable material having no liquid-crystallinity) and the liquid crystal material should also meet the prescribed mixing ratio mentioned above. In a case where dielectric liquid crystal is used, in particular, the compound having liquid-crystallinity may account for 100% of the polymerizable material, so that two regions consisting of liquid crystal having a small molecular weight and liquid crystal having a large molecular weight are formed. By applying two voltages each corresponding to a driving voltage for the former region (consisting of liquid crystal having a small molecular weight) and a driving voltage for the latter region (consisting of liquid crystal having a large molecular weight) to such a liquid crystal device in a controlled manner, a dielectric liquid crystal display device capable of displaying tones of different levels can be realized.

Moreover, the liquid crystal material to be used in the present invention should preferably be a chemically stable liquid crystal material which includes a liquid crystal material containing fluorine or chlorine and shows a positive anisotropy of dielectric constant. Examples of such liquid crystal materials are, though not limited to what is listed herein, ZLI-4801-1000, ZLI-4801-001, ZLI-4792 (all manufactured by Merck & Co., Inc.), and the like. Liquid crystal materials which do not contain fluorine or chlorine, for example, those which contain cyanobiphenyl, pyrimidine compounds, or the like, are inferior in terms of voltage-holding ratio characteristics, heat-resistance reliability, light-resistance reliability, etc.

Moreover, it is preferable that the liquid crystal material to be used in the present invention is such that the a phase transition temperature $T_{NI}$ between a liquid crystal phase and an isotropic liquid phase thereof is 80° C. to 120° C. If the phase transition temperature $T_{NI}$ is less than 80° C., heat resistance characteristics of the liquid crystal device deteriorate, and the operational temperature range of the liquid crystal device lowers. Therefore, the practicality of the liquid crystal device decreases. If The phase transition temperature $T_{NI}$ is more than 120° C., on the other hand, a compatible temperature of the liquid crystal material and the polymer resin composition increases, therefore making it very hard to produce a uniformly-formed liquid crystal panel.

It is necessary that the liquid crystal material to be used is sufficiently refined so as to have a specific resistance of $10^{12}$ Ω.cm or more, and preferably that of $10^{13}$ Ω.cm or more.

It is also effective to add an optically active chiral dopant and/or cholesteric liquid crystal to the liquid crystal material. More specifically, a cholesteric phase emerges because of the presence of the chiral dopant; in cases where a helical pitch of the liquid crystal is identical with a wavelength of light in a visible wavelength range, for example, it therefore becomes possible to control between selectively reflecting light corresponding to the helical pitch of the liquid crystal, displaying a transparent state, or a light-scattering state, by turning on and off an electrical field. It is always expected that display characteristics of the liquid crystal device are improved owing to a twisting force of a focal conic generated due to the addition of the chiral dopant.

The chiral dopant and/or the cholesteric liquid crystal to be used should preferably be, if at all, added to the liquid crystal material at a ratio in a range of 0.1% to 5%, and more preferably 0.1% to 2%, with respect to the liquid crystal material. If a smaller ratio of the chiral dopant and/or the cholesteric liquid crystal than this range is added to the liquid crystal material, the effect of improving display characteristics of the liquid crystal device is reduced. If a larger ratio of the chiral dopant and/or the cholesteric liquid crystal than this range is added to the liquid crystal material, on the other hand, leads to a large hysteresis, and the voltage-holding ratio characteristics of the liquid crystal device tend to worsen.

Moreover, it is possible to improve contrast of the liquid crystal device or to realize a multicolor liquid crystal device by ensuring that the liquid crystal includes one or more kinds of dichroic dyes, owing to a light-absorption effect. The dichroic dye(s) to be used should preferably be, if at all, added to the liquid crystal material at a ratio, by weight, in a range of 0.5% to 10%, and more preferably 1% to 5%, with respect to the liquid crystal material. If a smaller ratio of the dichroic dye(s) than this range is added to the liquid crystal material, a sufficient effect does not result from the addition thereof. If a larger ratio of the dichroic dye(s) than this range is added to the liquid crystal material, on the other hand, display characteristics (such as voltage-holding ratio characteristics, response speed, and voltage-transmittance hysteresis) of the liquid crystal device deteriorate.

Hereinafter, polymerization initiators to be optionally added to the mixture of the polymerizable material and the liquid crystal material will be described.

Compounds used in paints, adhesives, etc. can be used as a polymerization initiator. Examples of polymerization initiators are: Irgacure 651, Irgacure 184, Irgacure 907 (all manufactured by: CIBA-GEIGY Corporation), Darocure 1173, Darocure 1116, Darocure 2956 (all manufactured by: E. Merck & Co., Inc.), and the like.

As for the amount of such a polymerization initiator to be added, it depends on reactiveness of the individual compound, so the present invention provides no particular prescription. In the case of a photopolymerization initiator, however, it should preferably be, if at all, added to the mixture of the liquid crystal material and the photopolymerizable material (including a polymerizable liquid crystal prepolymer) at a ratio of 0.01% to 5%, with respect to the mixture. If the photopolymerization initiator accounts for more than 5%, the phase separation rate of the liquid crystal composition and the polymer resin composition is so high that it becomes impossible to control the sizes of the liquid crystal regions, therefore creating the following problems: Since liquid crystal droplets are small, the liquid crystal device requires a high driving voltage, and an orientation film on a substrate has a weak orientation control over, the liquid crystal regions. Moreover, liquid crystal regions which are present within pixel regions decrease in number because liquid crystal droplets formed in weakly-irradiated regions become small in cases where a photomask is used. As a result, contrast of the liquid crystal device decreases. If the photopolymerization initiator accounts for less than 0.05%, on the other hand, a sufficient polymerization reaction cannot be conducted.

Moreover, a hardening accelerator can be added in order to prompt the polymerization reaction, if necessary.

Figure 6:
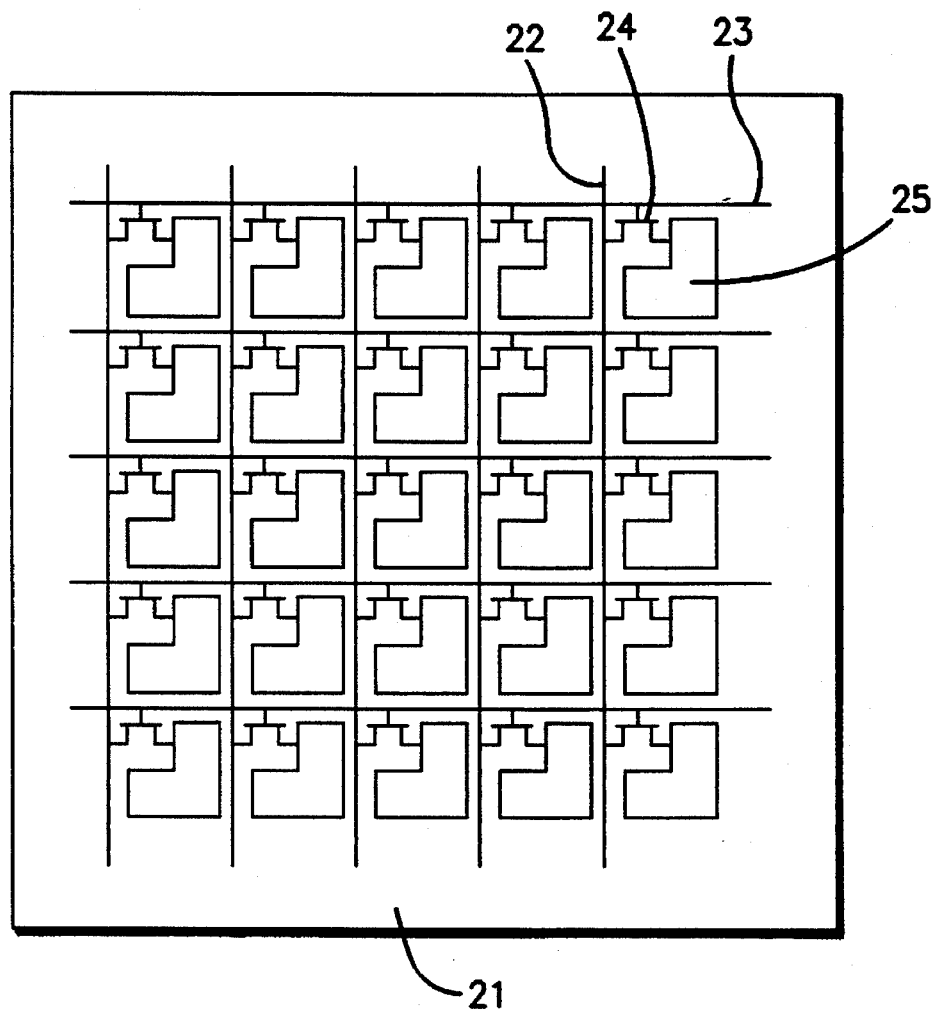
FIG. 6 is a schematic plane view showing one embodiment of a liquid crystal display device according to the present invention.
Figure 7:
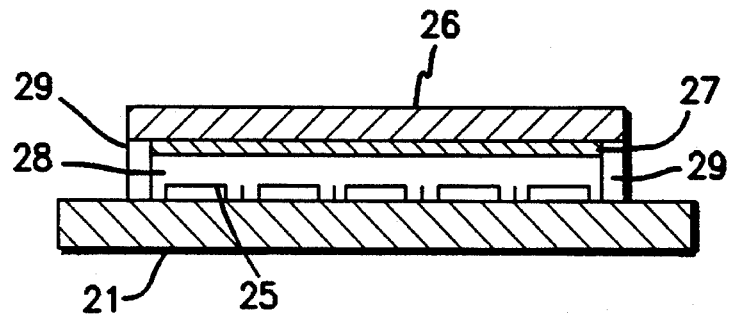
FIG. 7 is a schematic cross-sectional view showing one embodiment of a liquid crystal display device according to the present invention.

The polymer dispersed liquid crystal complex film can be, for example, applied to a liquid crystal display device as shown in FIGS. 6 and 7. This liquid crystal display device includes an electrode substrate for displaying purposes and a counter electrode substrate, between which a display medium 28 using the polymer dispersed liquid crystal complex film of the present example is interposed. The electrode substrate for displaying purposes, which is of an active matrix driving system, includes pixel electrodes 25 and switching transistors 24 each corresponding to each pixel electrode 25 as well as bus lines such as signal lines 22, scanning lines 23, etc. formed on a transparent insulating substrate 21 made of glass having no birefringence. The signal lines 22, scanning lines 23, pixel electrodes 25, and the switching transistors 24 are arranged in a matrix shape.

As the switching transistors 24, a-Si TFTs and the like are formed. The counter electrode substrate includes counter electrodes 27 formed on a transparent insulating substrate 26 made of glass, each counter electrode 27 formed so as to correspond to each pixel electrode 25 of the electrode substrate for displaying purposes. The above-mentioned pixel electrodes 25 and the counter electrodes 27 are transparent electrodes for applying a voltage to the display medium 28, and are made of ITO (Indium Tin Oxide). The display medium 28 is sealed by a seal 29 consisting of epoxy resin and the like.

The driving system and the configuration of the polymer dispersed liquid crystal device are not limited to the above-mentioned active matrix driving system using TFTs, but an active matrix driving system/configuration using MIMs (Metal-Insulator-Metals), or a simple matrix driving system/configuration can alternatively be used. Moreover, the electrode substrates can alternatively be made of a plastic film, etc. instead of glass, so that the liquid crystal device has a smaller weight and requires lower manufacturing costs.

By providing two polarizing plates for the liquid crystal device of the above-mentioned configuration, the two polarizing plates being disposed in a crossed-Nicol state, liquid crystal display devices having high contrast and steep driving voltage characteristics, for example, a liquid crystal display device of a TN mode, an STN mode, an ECB mode, a guest-host mode, and a ferroelectric liquid crystal display device can be produced.

Alternatively, only one polarizing plate may be provided for either one of the substrates. For example, a reflector may be formed on the back of a liquid crystal cell, or a liquid crystal material added with a dichroic dye may be used. In this case, light is extracted at a greater efficiency so that a brighter display can be obtained as compared to the case where two polarizing plates are used.

A liquid crystal device which uses the polymer dispersed liquid crystal complex film of the present invention can alternatively have a configuration in which liquid crystal of an FLC (SSF) mode or an ECB mode, which are conventional display modes, is contained in or partially partitioned by the polymer matrix. This makes it possible to realize a larger display and to use films for the substrates instead of glass.

Hereinafter, the present invention will be described by way of examples. However, the scope of the present invention is not to be limited thereto.

EXAMPLE 1

As Example 1 of the present invention, a liquid crystal display device was fabricated as follows:

First, a homogeneous mixture containing a photopolymerizable material consisting of 0.02 g of a bifunctional acrylate monomer (R-684, manufactured by Nippon Kayaku K.K.) and 0.18 g of isobornyl acrylate; 0.78 g of a liquid crystal material (ZLI-4792, manufactured by Merck & Co., Inc.); and 0.03 g of a photopolymerization initiator (Irgacure 651, manufactured by CIBA-GEIGY Corporation) was prepared.

Next, a cell was formed using two glass plates (flint glass with ITO having a thickness of 500 Angstroms, manufactured by Nippon Sheet Glass Co., Ltd.) with spacers each having a diameter of 12 μm interposed therebetween. The two glass plates serve as substrates, while the ITO on each glass plate serves as an electrode. Then, the above-mentioned mixture was injected into the cell.

Then, the cell was irradiated with UV-rays by using a high-pressure mercury lamp at an illuminance of 50 mW/cm$^2$ (at 365 nm; measured by UIT-101: a UV illuminometer manufactured by USHIO INC.) for 60 seconds to conduct photopolymerization. Thus, phase separation of the liquid crystal composition and the polymer composition was conducted so as to form a polymer dispersed liquid crystal complex film.

A value ΔT and a glass transition temperature $T_g$ of a liquid crystal display device thus obtained were measured by the method(s) described earlier.

Figure 8:
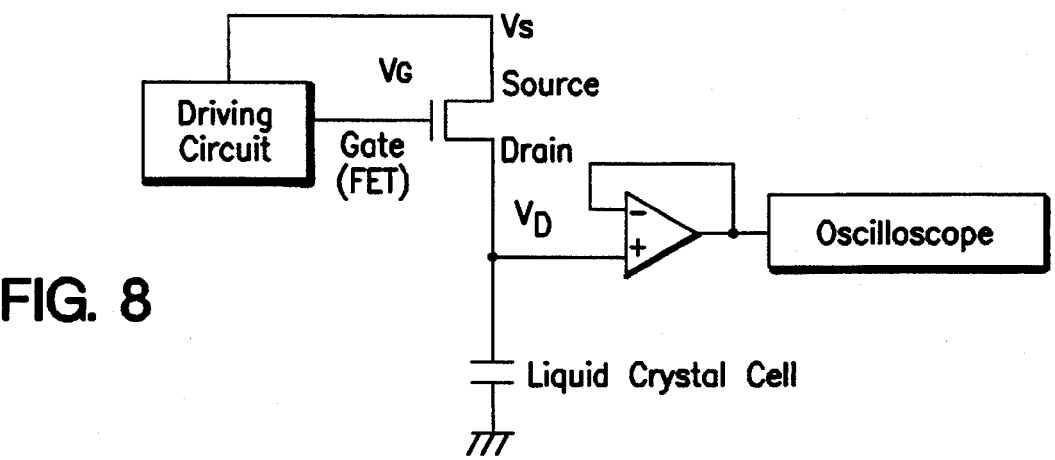
FIG. 8 is a circuit diagram of an apparatus for measuring a voltage-holding ratio.

Voltage-holding rate HR of the liquid crystal display device at room temperature was measured by an apparatus for measuring a voltage-holding ratio shown in FIG. 8. The apparatus, as is shown in FIG. 8, includes a switching transistor (FET) for applying a voltage between electrodes of a liquid crystal device, a driving circuit, and a circuit for measuring the amount of discharged of electric charges stored in a liquid crystal cell of the liquid crystal display device.

Moreover, regarding electrooptical characteristics (voltage-transmittance characteristics) of the liquid crystal display device, the following values were measured. First, a light transmittance $T_0$ under no voltage applied, a light transmittance $T_{100}$ under an alternating voltage of 50 V applied, and a response time τd required for the light transmittance to vary by 90% after a voltage is stopped being applied were measured. Moreover, a value $\Delta V/V_{50}$ obtained by normalizing a voltage-transmittance hysteresis width ΔV by an intermediate gray tone voltage $V_{50}$ was measured. Then, a threshold voltage $V_{th}$ and a saturation voltage $V_s$ were measured. The threshold voltage $V_{th}$ is defined as an applied voltage when the light transmittance of the liquid crystal device was increased by 10% of a value obtained by subtracting the above-defined light transmittance $T_0$ from a saturation transmittance $T_s$ under an excess voltage applied. The saturation voltage $V_s$ is defined as an applied voltage when the light transmittance was increased by 90% of the value obtained by subtracting the transmittance $T_0$ from the saturation transmittance $T_s$ under an excess voltage applied. (An optical system was used in which a converging angle with respect to a light source thereof was 6° C.) Results of these measurements are listed in Table 1.

EXAMPLES 2 AND 3, AND COMPARATIVE EXAMPLE 1

Polymer dispersed liquid crystal display devices according to Examples 2 and 3 of the present invention, and a liquid crystal display device as Comparative Example 1 were fabricated as follows:

A mixture including a photopolymerizable material and a liquid crystal material was prepared in each of Examples 2 and 3 and Comparative Example 1. As the photopolymerizable material, 0.02 g of trimethylolpropane triacrylate and 0.17 g of isobornyl acrylate were used in each of Examples 2 and 3 and Comparative Example 1. As the liquid crystal material, 0.78 g of a fluorine-containing liquid crystal material (ZLI-4801-000, manufactured by Merck & Co., Inc.), 0.78 g of a fluorine-chlorine-containing liquid crystal material (TL-202, manufactured by Merck & Co., Inc.), and 0.78 g of a cyanobiphenyl-containing liquid crystal material (E-8, manufactured by Merck & Co., Inc.) were used, respectively, in Examples 2 and 3 and Comparative Example 1. The liquid crystal display devices were fabricated using the above-mentioned mixtures, by the same method as that in Example 1.

Similar measurements to Those in Example 1 were taken with respect to each liquid crystal display device; results of the measurements are listed in Table 1. Electrooptical characteristics of each liquid crystal device at room temperature, after a liquid crystal cell thereof was heated at 80° C. for an hour, are listed in Table 2.

The liquid crystal devices of Examples 2 and 3 and Comparative Example 1 include a polymer resin composition having a relatively high glass transition temperature $T_g$. The liquid crystal devices of Examples 2 and 3, which use the fluorine-containing liquid crystal material, do not include: a cyano Group, a pyrimidine ring, or the like, which are likely to gather impurities. Therefore, the liquid crystal devices of Examples 2 and 3 have a high voltage-holding ratio. Moreover, the liquid crystal material used in the liquid crystal device of Example 3 contains chlorine as well, and therefore has a large anisotropy Δn of refractive index, so that the light transmittance $T_0$ under no voltage applied is smaller than in the case of Example 2. As a result, a contrast ratio $T_{100}/T_0$ thereof was greatly improved.

The liquid crystal device of Comparative Example 1, on the other hand, uses the cyanobiphenyl-containing liquid crystal material. Therefore, the voltage-holding ratio of the liquid crystal cell thereof is insufficient as compared with those of Examples 1, 2, and 3, indicating that the liquid crystal device of Comparative Example 1 has small practicality. Moreover, as is seen from Table 2, the liquid crystal display devices of Examples 2 and 3 show substantially no decrease in contrast thereof after being heated for an hour, as compared with a decrease in contrast of the liquid crystal of Comparative Example 1. This indicates that the liquid crystal devices of Examples 2 and 3 have excellent heat resistance characteristics. Furthermore, it can be seen that the response time τd is greatly shortened in Examples 1, 2, and 3, as compared with that in Comparative Example 1.

COMPARATIVE EXAMPLE 2

As Comparative Example 2, a polymer dispersed liquid crystal display device was fabricated as follows:

A homogeneous mixture containing 0.78 g of a liquid crystal material (ZLI-4792, manufactured by Merck & Co., Inc.); and a photopolymerizable material consisting of 0.02 g of a bifunctional acrylate monomer (R-684, manufactured by Nippon Kayaku K.K.) and 0.17 g of 2-ethylhexyl acrylate (Tg: −55° C.) was prepared. The liquid crystal device was fabricated using the above-mentioned mixture, by the same method as that in Example 1.

Similar measurements to those in Example 1 were taken with respect to the liquid crystal display device; results of the measurements are listed in Table 1.

COMPARATIVE EXAMPLE 3

As Comparative Example 3, a polymer dispersed liquid crystal display device was fabricated as follows:

A homogeneous mixture containing 0.78 g of a liquid crystal material (ZLI-4792, manufactured by Merck & Co., Inc.); and a photopolymerizable material consisting of 0.02 g of trimethylol propane triacrylate, 0.06 g of n-lauryl acrylate (Tg: −30° C.), and 0.11 g of 2-ethylhexyl acrylate was prepared. The liquid crystal display device was fabricated using the above-mentioned mixture, by the same method as that used in Example 1.

Similar measurements to those in Example 1 were taken with respect to the liquid crystal display device; results of the measurements are listed in Table 1.

As is seen from Table 1, the liquid crystal devices of Comparative Examples 2 and 3 use a monomer(s) having a low glass transition temperature $T_g$ as a main content of the polymerizable materials thereof. Therefore, the value $\Delta T$ is large in both cases, indicative of insufficient electrooptical characteristics and heat resistance.

EXAMPLE 4

As Example 4 of the present invention, a polymer dispersed liquid crystal display device was fabricated as follows:

A homogeneous mixture containing a photopolymerizable material consisting of 0.02 g of a bifunctional acrylate monomer (R-684, manufactured by Nippon Kayaku K.K.), 0.15 g of isobornyl acrylate, and 0.03 g of a fluorine-containing monomer consisting of β-(perfluorooctyl)ethyl acrylate; 0.78 g of a liquid crystal material (ZLI-4792, manufactured by Merck & Co., Inc.); and 0.03 g of a photopolymerization initiator (Irgacure 651, manufactured by CIBA-GEIGY Corporation) was prepared. The liquid crystal display device was fabricated using the above-mentioned mixture, by the same method as that in Example 1.

Similar measurements to those in Example 1 were taken with respect to the liquid crystal display device; results of the measurements are listed in Table 1.

EXAMPLE 5

As Example 5 of the present invention, a polymer dispersed liquid crystal display device was fabricated as follows:

A homogeneous mixture containing a photopolymerizable material consisting of 0.02 g of a bifunctional acrylate monomer (R-684, manufactured by Nippon Kayaku K.K.), 0.15 g of isobornyl acrylate, and 0.03 g of a silicon-containing monomer (KBM 503, manufactured by Shin-Etsu Chemical Co., Ltd.); and 0.78 g of a liquid crystal material (ZLI-4792, manufactured by Merck & Co., Inc.) was prepared. The liquid crystal display device was fabricated using the above-mentioned mixture, by the same method as that in Example 1.

Similar measurements to those in Example 1 were taken with respect to the liquid crystal display device; results of the measurements are listed in Table 1.

EXAMPLES 6 AND 7, AND COMPARATIVE EXAMPLE 4

Polymer dispersed liquid crystal display devices according to Examples 6 and 7 of the present invention, and a liquid crystal display device as Comparative Example 4 were fabricated as follows:

A mixture including a photopolymerizable material and a liquid crystal material was prepared in each of Examples 6 and 7 and Comparative Example 4. As the photopolymerizable material, 0.02 g of trimethylolpropane triacrylate, 0.16 g of isobornyl acrylate, and 0.02 g of a fluorine-containing monomer consisting of β-(perfluorooctyl)ethyl acrylate were used in each of Examples 6 and 7 and Comparative Example 4. As the liquid crystal material, 0.78 g of a fluorine-containing liquid crystal material (ZLI-4801-000, manufactured by Merck & Co., Inc.), 0.78 g of a fluorine-chlorine-containing liquid crystal material (TL-202, manufactured by Merck & Co., Inc.), and 0.78 g of a cyanobiphenyl-containing liquid crystal material (E-8, manufactured by Merck & Co., Inc.) were used, respectively, in Examples 6 and 7 and Comparative Example 4. The liquid crystal display devices were fabricated using the above-mentioned mixtures, by the same method as that in Example 1.

Similar measurements to those in Example 1 were taken with respect to each liquid crystal display device; results of the measurements are listed in Table 1. Electrooptical characteristics of each liquid crystal device at room temperature, after a liquid crystal cell thereof was heated at 80° C. for an hour, are listed in Table 2.

The liquid crystal devices of Examples 6 and 7 and Comparative Example 4 include a polymer resin composition which contains a fluorine-containing polymer and has a relatively high glass transition temperature $T_g$. The liquid crystal devices of Examples 6 and 7, which use the fluorine-containing liquid crystal material, do not include a cyano group, a pyrimidine ring, or the like, which are likely to gather impurities. Therefore, the liquid crystal devices of Examples 6 and 7 have a high voltage-holding ratio. Moreover, in Example 7, the liquid crystal material used therein also contains chlorine, and therefore has a large anisotropy $\Delta n$ of refractive index, so that a light transmittance $T_0$ thereof under no voltage applied is smaller than in the case of Example 6. As a result, a contrast ratio $T_{100}/T_0$ is greatly improved in Example 7.

The liquid crystal device of Comparative Example 4, on the other hand, uses the cyanobiphenyl-containing liquid crystal material. Therefore, the voltage-holding ratio of the liquid crystal cell thereof is insufficient as compared with those of Examples 4, 5, 6, and 7, indicating that the liquid crystal device of Comparative Example 4 has small practicality.

Moreover, Examples 4, 6, and 7 are counterparts of, respectively, Examples 1, 2, and 3 with a difference that the fluorine-containing monomer is added in Examples 4, 6, and 7; it was observed that a voltage-holding ratio HR of a liquid crystal cell of each of Examples 4, 6, and 7 was slightly lower than those of the liquid crystal cells in Examples 1, 2, and 3, because of the addition of the fluorine-containing

COMPARATIVE EXAMPLE 5

As Comparative Example 2, a polymer dispersed liquid crystal display device was fabricated as follows:

A homogeneous mixture containing 0.78 g of a liquid crystal material (ZLI-4792, manufactured by Merck & Co., Inc.); and a photopolymerizable material consisting of 0.02 g of a bifunctional acrylate monomer (R-684, manufactured by Nippon Kayaku K.K.), 0.15 g of 2-ethylhexyl acrylate (Tg: −55° C.), and 0.03 g of a fluorine-containing monomer consisting of β-(perfluorooctyl)ethyl acrylate was prepared. The liquid crystal display device was fabricated using the above-mentioned mixture, by the same method as that in Example 1.

Similar measurements to those in Example 1 were taken with respect to the liquid crystal display device; results of the measurements are listed in Table 1.

COMPARATIVE EXAMPLE 6

As Comparative Example 6, a polymer dispersed liquid crystal display device was fabricated as follows:

A homogeneous mixture containing 0.78 g of a liquid crystal material (ZLI-4792, manufactured by Merck & Co., Inc.); and a photopolymerizable material consisting of 0.02 g of trimethylol propane triacrylate, 0.05 g of n-lauryl acrylate (Tg: −30° C.), 0.10 g of 2-ethylhexyl acrylate, and 0.03 g of a fluorine-containing monomer consisting of β-(perfluorooctyl)ethyl acrylate was prepared. The liquid crystal display device was fabricated using the above-mentioned mixture, by the same method as that in Example 1.

Similar measurements to those in Example 1 were taken with respect to the liquid crystal display device; results of the measurements are listed in Table 1.

The liquid crystal devices of Comparative Example 5 and 6 include a fluorine-containing polymer and use a monomer(s) having a low glass transition temperature $T_g$ as a main content of the polymerizable materials thereof. Therefore, the liquid crystal devices of Comparative Example 5 and 6 have a large T value, indicative of insufficient electrooptical characteristics and heat resistance. It can be seen that the liquid crystal devices of Examples 4, 5, 6, and 7 have improved electrooptical characteristics and heat resistance as compared with those of the liquid crystal devices of Comparative Example 5 and 6.

EXAMPLE 8

As Example 8 of the present invention, a polymer dispersed liquid crystal display device was fabricated as follows:

A homogeneous mixture containing a liquid crystal material consisting of 0.76 g of a fluorine-containing liquid crystal material (ZLI-4801-000, manufactured by Merck & Co., Inc.) and 0.01 g of a chiral dopant (S-811, manufactured by Merck & Co., Inc.); and a photopolymerizable material consisting of 0.02 g of trimethylolpropane triacrylate and 0.17 g of isobornyl acrylate was prepared. The liquid crystal display device was fabricated using the above-mentioned mixture, by the same method as that in Example 1.

Similar measurements to those in Example 1 were taken with respect to the liquid crystal display device; results of the measurements are listed in Table 1.

EXAMPLE 9

As Example 9 of the present invention, a polymer dispersed liquid crystal display device was fabricated as follows:

A homogeneous mixture containing a liquid crystal material consisting of 0.76 g of a fluorine-containing liquid crystal material (ZLI-4801-000, manufactured by Merck & Co., Inc.) and 0.01 g of a chiral dopant (S-811, manufactured by Merck & Co., Inc.); and a polymerizable material consisting of 0.02 g of trimethylolpropane triacrylate, 0.15 g of isobornyl acrylate, and 0.03 g of a fluorine-containing monomer consisting of β-(perfluorooctyl)ethyl acrylate was prepared. The liquid crystal display device was fabricated using the above-mentioned mixture, by the same method as that in Example 1.

Similar measurements to those in Example 1 were taken with respect to the liquid crystal display device; results of the measurements are listed in Table 1.

Furthermore, it can be seen that the response time τd is shortened in Examples 8 and 9, because the chiral dopants were added by a few percent to the liquid crystal materials used therein.

EXAMPLE 10

As Example 10 of the present invention, a polymer dispersed liquid crystal display device was fabricated as follows:

A homogeneous mixture containing a dye-containing liquid crystal material obtained by mixing 0.75 g of a fluorine-containing liquid crystal material (ZLI-4801-000, manufactured by Merck & Co., Inc.) with 0.03 g of an anthraquinone-type dichroic dye (D 37, manufactured by BDH Limited) having a maximal absorption wavelength at 556 nm; and a photopolymerizable material consisting of 0.02 g of trimethylolpropane triacrylate and 0.17 g of isobornyl acrylate was prepared. The liquid crystal display device was fabricated using the above-mentioned mixture, by the same method as that in Example 1.

Similar measurements to those in Example 1 were taken with respect to the liquid crystal display device; results of the measurements are listed in Table 1.

EXAMPLE 11

As Example 11 of the present invention, a polymer dispersed liquid crystal display device was fabricated as follows:

A homogeneous mixture containing a dye-containing liquid crystal material obtained by mixing 0.75 g of a fluorine-containing liquid crystal material (ZLI-4801-000, manufactured by Merck & Co., Inc.) with 0.03 g of an anthraquinone-type dichroic dye (D 37, manufactured by BDH Limited) having a maximal absorption wavelength at 556 nm; and a polymerizable material consisting of 0.02 g of trimethylolpropane triacrylate, 0.15 g of isobornyl acrylate, and 0.03 g of a fluorine-containing monomer consisting of β-(perfluorooctyl)ethyl acrylate was prepared. The liquid crystal display device was fabricated using the above-mentioned mixture, by the same method as that in Example 1.

Similar measurements to those in Example 1 were taken with respect to the liquid crystal display device; results of the measurements are listed in Table 1.

It was observed that the liquid crystal device of each of Examples 10 and 11 was colored because of absorption of light in visible wavelengths due to the addition of the dichroic dye, whereby the contrast thereof was slightly improved.

EXAMPLE 12

As Example 12 of the present invention, a polymer dispersed liquid crystal display device was fabricated as follows:

First, a homogeneous mixture containing 0.75 g of a fluorine-containing liquid crystal material (ZLI-4801-000, manufactured by Merck & Co., Inc.); a polymerizable material for forming a polymer wall consisting of 0.12 g of an aliphatic-type epoxy resin (thermosetting-resin Denacol EX-314, manufactured by Nagase Kasei Kogyo corporation); and a curing accelerator consisting of 0.06 g of a modified-allphaticpolyamine type curing agent (Epomic Q-610, manufactured by Mitsui Petrochemical Co., Ltd.) was prepared.

Next, a cell was formed using two glass plates (flint glass with ITO having a thickness of 500 Angstroms, manufactured by Nippon Sheet Glass Co., Ltd.) with spacers each having a diameter of 12 μm interposed therebetween. Then, the above-mentioned mixture was injected into the cell. The cell was subjected to a heat treatment at 60° C. for an hour. Thus, phase separation of the liquid crystal composition and the polymer composition was conducted through heat-polymerization so as to form a liquid crystal display device having a polymer dispersed liquid crystal complex film.

Similar measurements to those in Example 1 were taken with respect to the liquid crystal display device; results of the measurements are listed in Table 1.

EXAMPLE 13

As Example 13 of the present invention, a polymer dispersed liquid crystal display device was fabricated as follows:

A homogeneous mixture containing 0.75 g of a fluorine-containing liquid crystal material (ZLI-4801-000, manufactured by Merck & Co., Inc.); a polymerizable material for forming a polymer wall consisting of 0.12 g of an aliphatic-type epoxy resin (thermosetting-resin Denacol EX-314, manufactured by Nagase Kasei Kogyo corporation); a curing accelerator consisting of 0.06 g of a modified-aliphatic-polyamine type curing agent (Epomic Q-610, manufactured by Mitsui Petrochemical Co., Ltd.), and 0.02 g of a silicon-containing monomer (KBM 403, manufactured by Shin-Etsu Chemical Co., Ltd.) was prepared. The liquid crystal display device was fabricated using the above-mentioned mixture, by the same method as that in Example 12.

Similar measurements to those in Example 1 were taken with respect to the liquid crystal display device; results of the measurements are listed in Table 1.

TABLE 1

|  | $\Delta T$ (°C.) | $T_g$ (°C.) | $T_0$ (%) | $T_{100}$ (%) | $V_{th}$ (V) | $V_s$ (V) | $\tau d$ (ms) | $\Delta V/V_{50}$ (%) | HR(%) (25° C.) |
|---|---|---|---|---|---|---|---|---|---|
| Example 1 | 8.0 | 74 | 9.2 | 77.6 | 6.2 | 8.0 | 40 | 5.8 | 98.1 |
| Example 2 | 4.2 | 85 | 10.3 | 76.2 | 6.5 | 8.5 | 35 | 4.3 | 97.7 |
| Example 3 | 3.8 | 85 | 1.0 | 80.4 | 4.3 | 6.2 | 20 | 3.5 | 98.0 |
| Comparative Example 1 | 4.5 | 85 | 1.2 | 74.0 | 22.0 | 35.7 | 186 | 23.0 | 78.8 |
| Comparative Example 2 | 26.2 | 2.5 | 6.8 | 73.0 | 6.6 | 8.8 | 58 | 16.6 | 97.5 |
| Comparative Example 3 | 18.3 | 12 | 6.0 | 72.2 | 6.8 | 9.0 | 55 | 14.8 | 97.8 |
| Example 4 | 9.0 | 68 | 10.2 | 77.0 | 5.8 | 7.5 | 32 | 4.1 | 98.5 |
| Example 5 | 8.6 | 71 | 9.0 | 75.1 | 5.5 | 7.5. | 35 | 4.8 | 89.8 |
| Example 6 | 8.4 | 72 | 11.3 | 76.4 | 6.1 | 7.8 | 34 | 4.1 | 97.9 |
| Example 7 | 8.2 | 72 | 1.1 | 75.0 | 5.4 | 7.3 | 18 | 3.0 | 98.4 |
| Comparative Example 4 | 8.6 | 72 | 1.0 | 68.0 | 23.6 | 38.1 | 213 | 18.6 | 68.9 |
| Comparative Example 5 | 27.6 | 1.7 | 6.5 | 72.2 | 6.8 | 9.0 | 67 | 14.8 | 97.5 |
| Comparative Example 6 | 13.6 | 7.2 | 7.3 | 70.7 | 6.3 | 8.8 | 72 | 13.6 | 97.8 |
| Example 8 | 5.1 | 85 | 4.0 | 76.0 | 6.3 | 8.8 | 22 | 5.0 | 92.2 |
| Example 9 | 8.0 | 75 | 3.8 | 75.1 | 8.7 | 11.0 | 17 | 4.3 | 89.7 |
| Example 10 | 4.8 | 85 | 0.8 | 78.1 | 8.4 | 11.0 | 87 | 11.2 | 89.7 |
| Example 11 | 8.2 | 75 | 0.9 | 76.2 | 10.5 | 12.7 | 82 | 10.3 | 87.3 |
| Example 12 | 4.0 | 88 | 3.0 | 75.2 | 10.1 | 12.4 | 73 | 10.3 | 88.3 |
| Example 13 | 7.2 | 81 | 4.3 | 75.3 | 10.1 | 12.3 | 67 | 9.8 | 89.5 |

TABLE 2

|  | $T_0$ (%) | $T_{100}$ (%) | Contrast Ratio $T_{100}/T_0$ | Vth (V) | Vs (V) |
| --- | --- | --- | --- | --- | --- |
| Example 2 (Before Heating) | 10.3 | 76.2 | 7.4 | 6.5 | 8.5 |
| Example 2 (After Heating) | 10.6 | 77.1 | 7.3 | 6.7 | 8.8 |
| Example 3 (Before Heating) | 1.0 | 80.4 | 80.4 | 4.3 | 6.2 |
| Example 3 (After Heating) | 1.1 | 81.0 | 73.6 | 4.6 | 6.3 |
| Comparative Example 1 (Before Heating) | 1.2 | 74.0 | 61.7 | 22.0 | 35.0 |
| Comparative Example 1 (After Heating) | 3.9 | 65.2 | 16.7 | 38.1 | 46.1 |
| Example 6 (Before Heating) | 11.3 | 76.4 | 6.8 | 6.1 | 7.8 |
| Example 6 (After Heating) | 11.6 | 77.5 | 6.7 | 6.5 | 8.3 |
| Example 7 (Before Heating) | 1.1 | 75.0 | 68.2 | 5.4 | 7.3 |
| Example 7 (After Heating) | 1.2 | 78.3 | 65.2 | 5.3 | 7.4 |
| Comparative Example 4 (Before Heating) | 1.0 | 68.0 | 68.0 | 23.6 | 38.1 |
| Comparative Example 4 (After Heating) | 3.8 | 64.2 | 16.9 | 37.1 | 46.6 |

EXAMPLE 14

Figure 9:
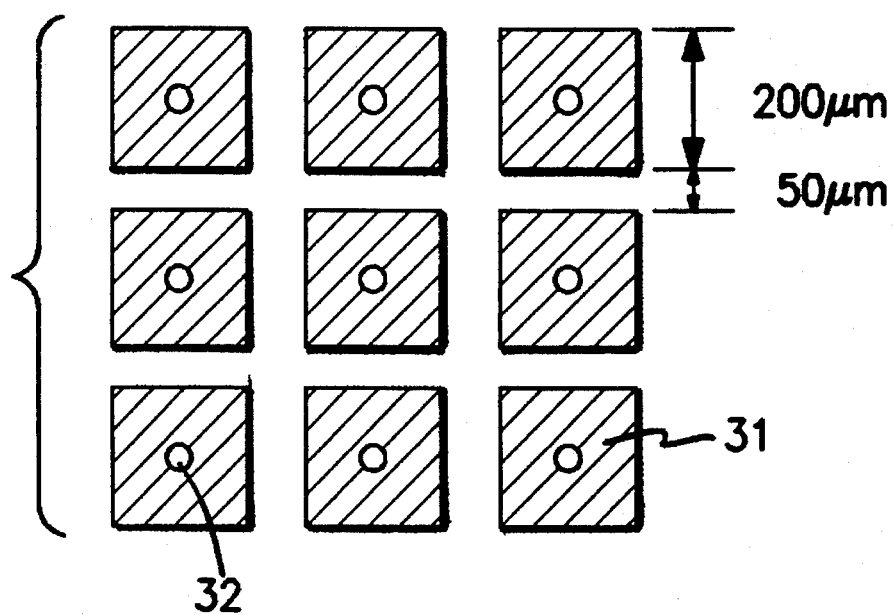
FIG. 9 is a view showing a pattern of a pattern for a photomask used in production of a liquid crystal display device according to Example 14 of the present invention.

As Example 14, a liquid crystal display device was fabricated as follows:

First, a cell was formed using two glass plates (thickness: 1.1 mm), each glass plate having a transparent electrode made of ITO having a thickness of 500 Angstroms formed thereon, with spacers each having a diameter of 6 μm interposed between the two glass plates so that the cell retained a certain thickness. Then, a photomask was disposed on the cell in such a way that pixel regions of the cell and masking portions of the photomask corresponded to each other. FIG. 9 shows the photomask used in the present example. As is shown in FIG. 9, the photomask has square masking portions 31 disposed in a matrix shape. One side of each square masking portion 31 is 200 μm. Adjoining masking portions 31 are spaced by 50 μm. A light transmitting hole 32 having a diameter of 25 μm is provided in the center of each masking portion 31.

Next, a mixture containing a photopolymerizable material consisting of 0.1 g of a bifunctional acrylate monomer (R-684, manufactured by Nippon Kayaku K.K.), 0.05 g of p-phenylstyrene, 0.80 g of isobornyl methacrylate, and 0.05 g of perphlorooctyl acrylate; 4 g of a liquid crystal material (ZLI-4792, manufactured by Merck & Co., Inc.) added with 0.3%, by weight, of a chiral dopant (S-811, manufactured by Merck & Co., Inc.); and 0.0025 g of a photopolymerization initiator (Irgacure 651, manufactured by CIBA-GEIGY Corporation) was prepared. The above-mentioned mixture was observed while being heated, which revealed that the mixture became homogeneous at 32° C. The mixture was heated to 34° C. and was injected into the cell.

Twenty cycles of light-irradiation was conducted for the cell, into which the mixture had been injected; each cycle consisted of a step where the cell was irradiated with parallel light beams through the photomask while being kept at 34° C. (one second), and a step where no light-irradiation was conducted (30 seconds). After the twenty cycles of light-irradiation had been conducted, the cell was further irradiated with parallel light beams for 5 minutes. The parallel light beams were obtained under a high-pressure mercury lamp where it had an illuminance of 10 mW/cm². Then, the temperature of the cell was lowered to 10° C., and the cell was irradiated with UV-rays at the same illuminance of 10 mW/cm² for 10 minutes while being kept at 10° C. Finally, the photomask was removed, and thereafter the cell was irradiated with UV-rays for 5 minutes so that the polymerizable material cured.

Figure 10:
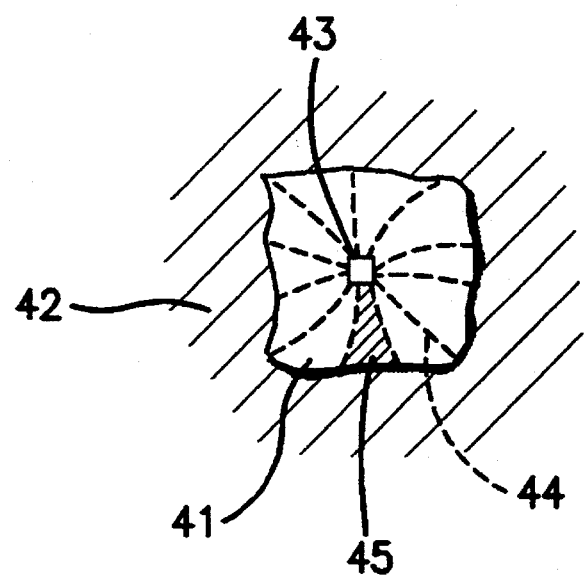
FIG. 10 is a plane view showing a pixel region of a liquid crystal display device according to Example 14 of the present invention.
Figure 11C:
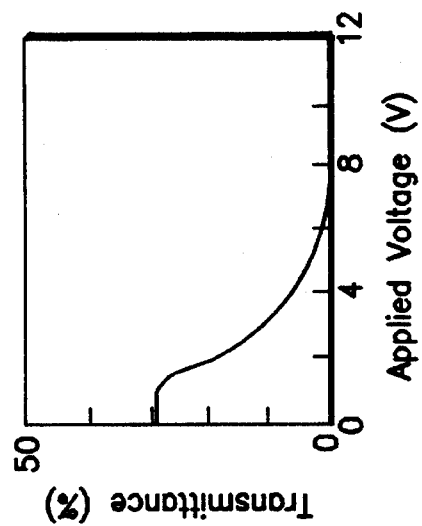
FIG. 11 is a set of graphs (a) to (e), showing the dependence of electrooptical characteristics of a liquid crystal display device according to Example 14 of the present invention on viewing angles.
Figure 11D:
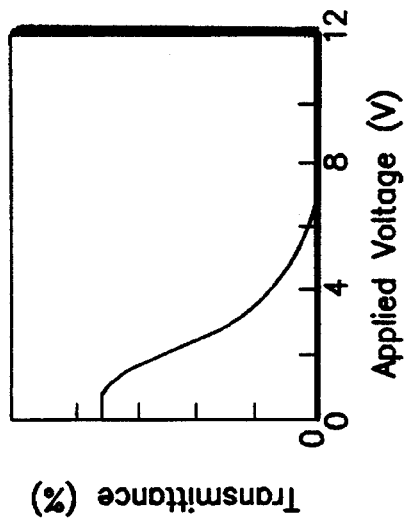
Figure 11A:
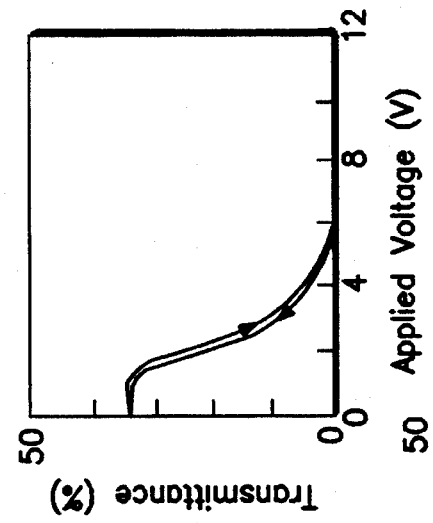
Figure 11B:
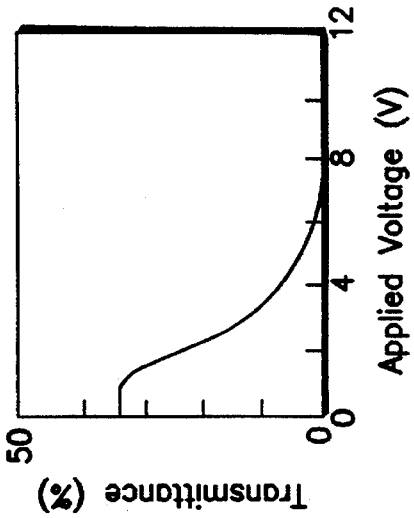
Figure 11E:
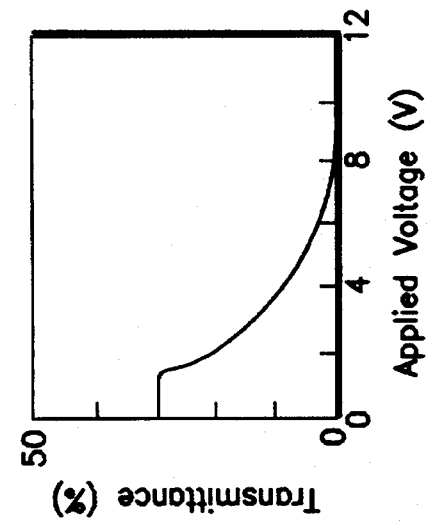

FIG. 10 shows a plane view of the cell thus obtained, the cell being observed with a polarization microscope. As is shown in FIG. 10, a liquid crystal region 41 was surrounded by a polymer matrix 42, and a configuration thereof was substantially the same as that of each masking portion 31 of the photomask. In the center of the liquid crystal region 41, a polymer island 43 corresponding to each light-transmitting hole 32 had been formed. Moreover, the liquid crystal region 41 was divided into a plurality of liquid crystal domains 45 by disclination lines 44. The liquid crystal domains 45 were arranged radially with the polymer island 43 being a center.

Furthermore, a polarizing plate was attached to each of the upper side and the back side of the cell in such a way that directions of polarization of the two polarizing plates were perpendicular to each other, so as to form a polymer-matrix type liquid crystal display device.

Table 3 shows electrooptical characteristics, a value ΔT, and the like of this liquid crystal display device. As for light transmittances under no voltage applied, a light transmittance in the case where two polarization plates disposed in a parallel-Nicol state is defined as 100%. As for response times, they are evaluated using an addition (τd+τr), wherein τd represents a response time required for a light transmittance to vary by 90% after a voltage is stopped being applied, and τr represents a response time required for a light transmittance to vary by 90% after a voltage is started being applied.

Figure 12:
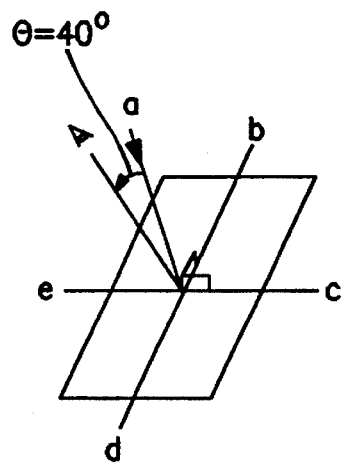
FIG. 12 is a diagram for describing the viewing angle in each of graphs (a) to (e) of FIG. 11.

FIG. 11 is a diagram showing the dependence of electrooptical characteristics of the liquid crystal display device on viewing angles, and consists of graphs (a) to (e). Graph (a) shows a relationship between applied voltages and light transmittances in cases where, as is shown in FIG. 12, a direction a vertical to the liquid crystal display device is the viewing angle. Graphs (b), (c), (d), and (e) show relationships between applied voltages and light transmittances, and they describe cases where the viewing angle is at an angle of 40° with respect to the direction a so as to be tilted in, respectively, directions b, c, d, and e, as is shown in FIG. 12. As is seen from FIG. 11, no such defects in viewing angle characteristics as an inversion phenomenon, where the contrast of a liquid crystal device is inverted, are found, irrespective of the viewing angle i.e. the direction in which the liquid crystal device is watched. The reason for this is that liquid crystal molecules of the liquid crystal device stand in various directions when an outside voltage is applied because of an interaction thereof with the polymer matrix, whereby the same apparent refractive index is attained irrespective of the viewing angle.

COMPARATIVE EXAMPLE 7

AS Comparative Example 7, a liquid crystal display device was fabricated as follows:

First, a cell was formed, with a similar mixture to that in Example 14 injected therein. A similar photomask to that used in FIG. 14 was disposed on the cell.

Twenty cycles of light-irradiation were conducted for the cell; each cycle consisted of a step where the cell was irradiated with parallel light beams through the photomask while being kept at 34° C. (one second), and a step where no light-irradiation was conducted (30 seconds). After the twenty cycles of light-irradiation had been conducted, the cell was further irradiated with parallel light beams for 10 minutes. The parallel light beams were obtained under a high pressure mercury lamp where it had an illuminance of 10 mW/cm$^2$. The cell thus obtained was observed with a polarizing microscope, which revealed that liquid crystal domains of the cell had substantially the same orientation as that in Example 14.

Furthermore, a polarizing plate was attached to each of the upper side and the back side of the cell in such a way that directions of polarization of the two polarizing plates were perpendicular to each other, so as to form a polymer-matrix type liquid crystal display device.

Table 3 shows electrooptical characteristics, a value ΔT, and the like of this liquid crystal display device.

TABLE 3

|  | Example 14 | Comparative Example 7 |
| --- | --- | --- |
| light transmittance under no voltage applied (%) | 38 | 38 |
| response time τd + τr (ms) | 35 | 46 |
| value ΔT (°C.) | 2 | 5.6 |
| $T_g$ of the polymer (°C.) | in the vicinity of 75 | in the vicinity of 75 |

As is seen from Table 3, the liquid crystal display device of Example 14 has a small ΔT value, as compared with that of Comparative Example 7. In other words, impurities hardly dissolve into the liquid crystal material in Example 14, whereby the response speed of the liquid crystal device is improved. Glass transition temperatures $T_g$ of the photopolymerizable materials alone were measured by a DSC method, which revealed that an absorption curve of photopolymerizable material had an inflection point in the vicinity of 75° C. Moreover, viewing angle characteristics of the liquid crystal display device of Comparative Example 7 were also improved.

EXAMPLE 15

As Example 15, a liquid crystal display device was fabricated as follows:

A mixture containing a photopolymerizable material consisting of 0.02 g of a bifunctional acrylate monomer (R-684, manufactured by Nippon Kayaku K.K.), 0.14 g of isobornyl acrylate, and 0.02 g of p-phenylstyrene; 0.78 g of a liquid crystal material (ZLI-4792, manufactured by Merck & Co., Inc.); and 0.03 g of a photopolymerization initiator (Irgacure 651, manufactured by CIBA-GEIGY Corporation) was prepared. The above-mentioned mixture was observed while being heated, which revealed that the mixture became homogeneous at 34° C. The mixture was heated to 36° C. and was injected into a cell consisting of two glass substrates with spacers each having a diameter of 12 μm interposed therebetween. The cell, into which the mixture had been injected, was irradiated with UV-rays for 60 seconds by means of a high-pressure mercury lamp at an illuminance of 50 mW/cm$^2$, so as to conduct a photopolymerization.

Then, the temperature of the cell was lowered to 5° C. at a rate of 1° C. per minute, and the cell was irradiated with UV-rays at an illuminance of 15 mW/cm$^2$ for 300 seconds, so as to sufficiently conduct a phase separation, whereby a polymer dispersed liquid crystal display device was fabricated. This liquid crystal display device was of a light scattering-transmission mode.

In the present example, the phase separation at the second irradiation with UV-rays is conducted in a temperature range where the mixture after the first irradiation with UV-rays has a liquid crystal phase at which the viscosity is higher than in an isotropic state and the liquid crystal has a higher orientation property than at room temperature. This liquid crystal phase is, in the case of the present example, a smectic phase.

Table 4 shows electrooptical characteristics, a value ΔT, and the like of this liquid crystal display device.

EXAMPLE 16

As Example 16, a liquid crystal display device was fabricated as follows:

A mixture containing a photopolymerizable material consisting of 0.02 g of a bifunctional acrylate monomer (R-684, manufactured by Nippon Kayaku K.K.), 0.14 g of isobornyl acrylate, and 0.02 g of p-phenylstyrene; 0.78 g of a liquid crystal material (ZLI-4792, manufactured by Merck & Co., Inc.); and a photopolymerization initiator consisting of 0.025 g of Irgacure 651 (manufactured by CIBA-GEIGY Corporation) and 0.005 g of benzoylperoxide [BPO] was prepared. The above-mentioned mixture was observed while being heated, which revealed that the mixture became homogeneous at 34° C. The mixture was heated to 36° C. and was injected into a cell consisting of two glass substrates with spacers each having a diameter of 12 μm interposed therebetween. The cell, into which the mixture had been injected, was irradiated with UV-rays for 60 seconds by means of a high-pressure mercury lamp at an illuminance of 50 mW/cm$^2$, so as to conduct a photopolymerization.

Then, the temperature of the cell was lowered to 5° C. at a ratio of 1° C. per minute. Thereafter, while keeping a thermostatic chamber at 5° C. in which the cell was disposed, a surface of the cell was scanned with a laser beam having a diameter of 2 μm by means of a XeCl eximer laser having an output power of 100 mW/pulse, a pulse width of 1 nm, and a wavelength of 308 nm, to form a polymer dispersed liquid crystal display device. This liquid crystal display device was of a light scattering-transmission mode.

In the present example, the first phase separation through polymerization is conducted by irradiation with UV-rays. Furthermore, a second phase separation through polymerization is conducted by a heating effect due to the laser beam, in a temperature range where the mixture after the first irradiation with UV-rays has a liquid crystal phase at which the viscosity is higher than in an isotropic state and the liquid crystal is more orderly than at room temperature.

Moreover, since the UV-ray XeCl eximer laser is used, the present example utilizes a synergistic effect of photoreaction by UV-rays as well as the heating effect due to the laser beam; however, a heating effect by means of a solid-state laser such as a Nd: YAG laser, or a gas laser such as an Ar-ion laser can generally be utilized alternatively.

Table 4 shows electrooptical characteristics, a value ΔT, and the like of this liquid crystal display device.

TABLE 4

|  | Example 15 | Example 16 |
|---|---|---|
| value ΔT (°C.) | 5.1 | 5.8 |
| $T_g$ of the polymer (°C.) | 76 | 76 |
| $T_0$ (%) | 1.2 | 1.5 |
| $T_{100}$ (%) | 77.8 | 76.9 |
| τd + τr (ms) | 40 | 43 |
| value ΔV / $V_{50}$ | 4.2 | 4.5 |

As is seen from Table 4, the liquid crystal display devices of Examples 15 and 16 each include a polymer resin composition having a small ΔT value, whereby display characteristics such as voltage-transmittance hysteresis characteristics and response speeds thereof are improved. The reason is that, in each of Examples 15 and 16, the second phase separation through polymerization is conducted at a low temperature where the mixture has a liquid crystal state, so that mutual dissolution of the liquid crystal composition and the polymer composition are restrained, whereby liquid crystal regions and a polymer region of the liquid crystal device are more clearly distinguished because of the phase separation.

EXAMPLE 17

As Example 17, a liquid crystal display device was fabricated as follows:

First, a cell was formed using two glass plates (thickness: 1.1 mm), each glass plate having a transparent electrode made of ITO having a thickness 500 Angstroms formed thereon, with spacers each having a diameter of 6 μm interposed between the two glass plates so that the cell retained a certain thickness. Then, the photomask shown in FIG. 9 was disposed on the cell in such a way that pixel regions of the cell and masking portions of the photomask corresponded to each other.

Next, a mixture containing a photopolymerizable material consisting of 0.1 g of a bifunctional acrylate monomer (R-684, manufactured by Nippon Kayaku K.K.), 0.05 g of p-phenylstyrene, and 0.85 g of isobornyl methacrylate; 4 g of a liquid crystal material (ZLI-4792, manufactured by Merck & Co., Inc.) added with 0.3%, by weight, of a chiral dopant (S-811, manufactured by Merck & Co., Inc,); and 0.0025 g of a photopolymerization initiator (Irgacure 651, manufactured by CIBA-GEIGY Corporation) was prepared. The above-mentioned mixture was observed while being heated, which revealed that the mixture became homogeneous at 32° C. The mixture was heated to 34° C. and was injected into the cell.

Twenty cycles of light-irradiation were conducted for the cell, into which the mixture had been injected; each cycle consisted of a step where the cell was irradiated with parallel light beams through the photomask while being kept at 34° C. (one second), and a step where no light-irradiation was conducted (30 seconds). After the twenty cycles of light-irradiation had been conducted, the cell was further irradiated with parallel light beams for 5 minutes. The parallel light beams were obtained under a high-pressure mercury lamp where it had an illuminance of 10 mW/cm². Then, the cell was irradiated with UV-rays at the same illuminance of 10 mW/cm² for 10 minutes. Finally, the photomask was removed, and thereafter the cell was irradiated with UV-rays for 5 minutes so that the polymerizable material cured.

The cell thus obtained was observed with a polarization microscope, which revealed that, as in Example 14, a pixel region (liquid crystal region) had such a configuration that a plurality of liquid crystal domains therein were oriented radially with a polymer island in the center.

Furthermore, a polarizing plate was attached to each of the upper side and the back side of the cell in such a way that the directions of polarization of the two polarizing plates were perpendicular to each other, so as to form a polymer-matrix type liquid crystal display device.

Table 5 shows electrooptical, characteristics, a value ΔT, and the like of this liquid crystal display device. The electrooptical characteristics and thermal characteristics of the liquid crystal device were measured by means of a liquid crystal evaluating apparatus (LCD-5000, manufactured by OTSUKA ELECTRONICS CO., Ltd.). As for light transmittances, they were measured by measuring an outgoing beam from the liquid crystal display device when a light beam from a halogen lamp was incident to the liquid crystal display device at a right angle and an electric field was applied, the liquid crystal being in a normally-white state. A lens having a converging angle of 24° was used. A light transmittance in the case where two polarization plates disposed in a parallel-Nicol state is defined as 100%. As for contrast ratios, they are defined as a ratio $T_0/T_{sat}$, wherein $T_0$ is a light transmittance when a voltage is stopped being applied, and $T_{sat}$ is a light transmittance under a saturation voltage is applied.

COMPARATIVE EXAMPLE 8

As Comparative Example 8, a polymer-matrix type liquid crystal display device was fabricated as follows:

A mixture containing a photopolymerizable material consisting of 0.20 g of a bifunctional acrylate monomer (R-684, manufactured by Nippon Kayaku K.K.), 0.02 g of p-phenylstyrene, 0.50 g of 2-ethylhexyl methacrylate, and 0.25 g of lauryl methacrylate; 4 g of a liquid crystal material (ZLI-4792, manufactured by Merck & Co., Inc.) added with 0.3%, by weight, of a chiral dopant (S-811, manufactured by Merck & Co., Inc.); and 0.0025 g of a photopolymerization initiator (Irgacure 651, manufactured by CIBA-GEIGY Corporation) was prepared. The above-mentioned mixture was observed while being heated, which revealed that the mixture became homogeneous at 26° C. The mixture was heated to 29° C. and was injected into a cell formed in the same manner as that in Example 17. Thereafter, a liquid crystal cell was formed while keeping the cell at 29° C., in the same manner as that in Example 17. Furthermore, a polarizing plate was attached to each of the upper side and the back side of the cell in such a way that directions of polarization of the two polarizing plates were perpendicular to each other, so as to form a polymermatrix type liquid crystal display device.

Table 5 shows electrooptical characteristics, a value ΔT, and the like of this liquid crystal display device.

TABLE 5

|  | Example 17 | Comparative Example 8 |
|---|---|---|
| value ΔT (°C.) | 4.8 | 26.1 |
| $T_g$ of the polymer (°C.) | 77 | 4 |
| $V_{th}$ (V) | 2.5 | 4.1 |
| τd + τr (ms) | 35 | 83 |
| contrast ratio | 38 | 31 |

As is seen from Table 5, the liquid crystal display device of Example 17 has a small ΔT value, and the photopolymerizable material has a high $T_g$. Therefore, mutual dissolution of the liquid crystal composition and the polymer resin composition are restrained, whereby threshold characteristics of voltage-transmitance characteristics and a response speed (τd+τr) of the liquid crystal device are improved.

Moreover, by using a photomask, the liquid crystal regions were clearly distinguished. As a result, the same apparent refractive index was attained irrespective of the viewing angle, whereby viewing characteristics of the liquid crystal device were improved. No such defects in viewing angle characteristics as an inversion phenomenon, i.e. inversion of contrast of the liquid crystal device, were found at any viewing angle. Moreover, change in contrast due to change in the viewing angle was small.

As is described above, a polymer dispersed liquid crystal complex film and a liquid crystal display device according to Examples 1 to 17 of the present invention, since a polymer wall (matrix) having a small ΔT value and a high glass transition temperature $T_g$ is introduced therein, can have display characteristics which are not affected by changes in thermal circumstances. Moreover, it is made possible to provide a polymer dispersed liquid crystal display device and a polymer-matrix type liquid crystal display device capable of responding at a higher speed than conventionally, displaying tones of different levels, and operating with a small voltage-transmittance hysteresis. A polymer-matrix type liquid crystal display device according to the present invention has highly stable display characteristics and excellent viewing characteristics.

EXAMPLE 18

Figure 13A:
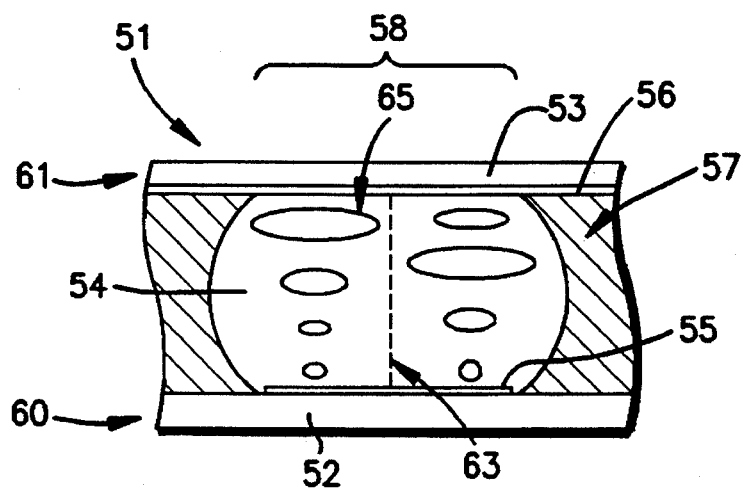
FIG. 13A is a cross-sectional view of a liquid crystal cell of a TN type according to Example 18 of the present invention in an initial state.
Figure 13B:
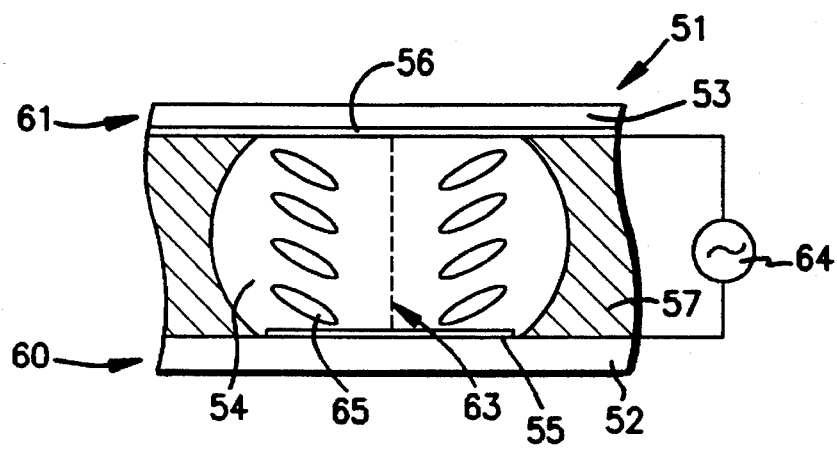
FIG. 13B is a cross-sectional view of a liquid crystal cell of a TN type according to Example 18 in a state where an intermediate gray tone is displayed.
Figure 13C:
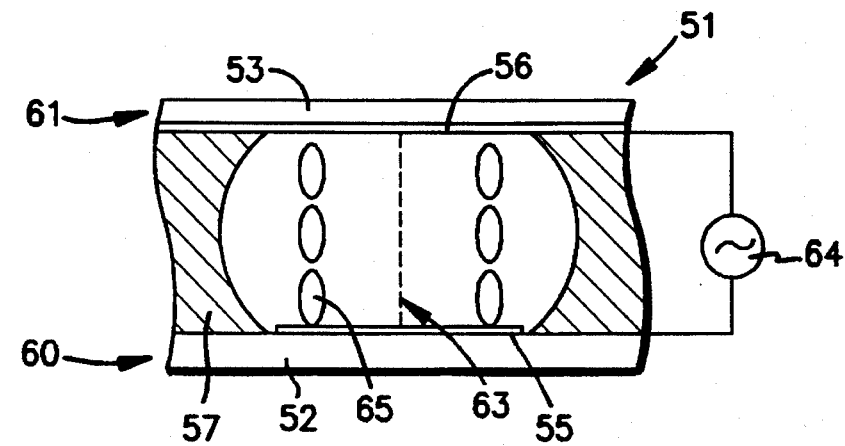
FIG. 13C is a cross-sectional view of a liquid crystal cell of a TN type according to Example 18 in a transparent state.

FIGS. 13A to 13C are cross-sectional views showing a liquid crystal cell 51 of a TN type according to Example 18. The liquid crystal cell 51 of a TN type included, a pair of glass substrates 52 and 53 (thickness: 1.1 mm), a plurality of pixel electrodes 55 formed in a matrix shape on the substrate 52, a common electrode 56 formed on the other substrate 53, liquid crystal regions 54 interposed between the substrates 52 and 53, and a polymer matrix 57. Each liquid crystal region 54 corresponded to and covered each pixel electrode 55. A pixel region 58 corresponded to a region of the liquid crystal cell 51 where each pixel electrode 55 was formed. Hereinafter, a method for fabricating the liquid crystal cell 51 of the present example will be described.

The pixel electrodes 55 and the common electrode 56 were transparent, and were made of ITO having a thickness 500 Angstroms. The transparent pixel electrodes 55 and the glass substrate 52 are, as a whole, defined as a display substrate 60. The transparent common electrode 56 and the glass substrate 53 are, as a whole, defined as a display substrate 61. Then, a cell was formed using the display substrates 60 and 61, with spacers (not shown) each having a diameter of 6 μm interposed therebetween so that the cell retained a certain thickness. The spacers had a spherical shape in the present example, however, they may alternatively have a cylindrical shape or a fiber-like shape. The display substrates 60 and 61 were sealed with a sealing material at peripheral portions thereof. Then, the photomask shown in FIG. 9 was disposed on the cell in such a way that pixel re,ions of the cell and masking portions of the photomask corresponded to each other.

Next, a mixture containing 4 g of a liquid crystal material (ZLI-4792, manufactured by Merck & Co., Inc.) added with 0.3%, by weight, of a chiral dopant (S-811, manufactured by Merck & Co., Inc.); a photopolymerizable material consisting of 0.1 g of a bifunctional acrylate monomer (R-684, manufactured by Nippon Kayaku K.K.), 0.05 g of p-phenylstyrene, and 0.85 g of isobornyl methacrylate; and 0.0025 g of a photopolymerization initiator (Irgacure 651, manufactured by CIBA-GEIGY Corporation) was prepared. The above-mentioned mixture was observed while being heated, which revealed that the mixture became homogeneous at 32° C.

The liquid crystal regions 54 and the polymer matrix 57 were formed in the following manner: First, the above-mentioned mixture was heated to 34° C. and was injected into the cell. Then, twenty cycles of light-irradiation were conducted for the cell, each cycle consisting of a step where the cell was irradiated with parallel light beams through the photomask while being kept at 34° C. (one second), and a step where no light-irradiation was conducted (30 seconds). The parallel light beams were obtained under a high-pressure mercury lamp where it had an illuminance of 10 mW/cm². After the twenty cycles of light-irradiation had been conducted, the cell was further irradiated with parallel light beams for 5 minutes. Then, the cell was irradiated with UV-rays at the same illuminance of 10 mW/cm² for 10 minutes. Finally, the photomask was removed, and thereafter the cell was irradiated with UV-rays for 5 minutes so that the polymerizable material in the mixture cured completely.

Figure 14:
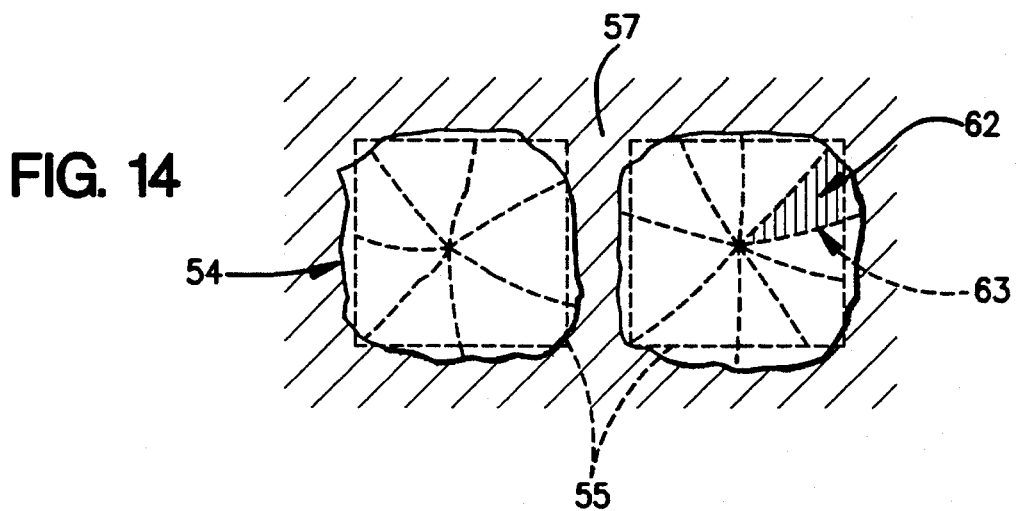
FIG. 14 is a plane view showing pixel regions of a liquid crystal display cell shown in FIGS. 13A to 13C.

The liquid crystal regions 54 and the polymer matrix 57 interposed between the pair of display substrates 60 and 61 were obtained through the above-mentioned polymerization process. FIG. 14 shows a plane view of the liquid crystal cell 51 thus obtained, the liquid crystal cell 51 being observed with a polarization microscope. As is shown in FIG. 14, each liquid crystal region 51 (corresponding to each pixel region 58) was divided into a plurality of liquid crystal domains 62 by disclination lines 63. The disclination lines started from an island-like portion formed in the center of each pixel region 58. The disclination lines 63 were formed radially or randomly, and they formed interfaces between one liquid crystal domain 62 and another. The liquid crystal domains 63, accordingly, were arranged radially or randomly with the island-like portion being a center.

Furthermore, a polarizing plate was attached to each of the upper side and the back side of the cell in such a way that directions of polarization of the two polarizing plates were perpendicular to each other, so as to form a polymer-matrix type liquid crystal display device.

Electrooptical characteristics (such as light transmittances, contrast ratios, etc.) and thermal characteristics of the liquid crystal display device were measured by means of a liquid crystal evaluating apparatus (LCD-5000, manufactured by OTSUKA ELECTRONICS CO., Ltd.) in the following manner: A light transmittance in the case where two polarization plates disposed in a parallel-Nicol state was defined as 100%. The measurements for the liquid crystal display device were conducted in a normally-white state. A light beam from a halogen lamp was incident to the liquid crystal display device at a right angle with respect to the substrates 52 and 53. Then, as is shown in FIGS. 13A and 13C, an electric field was turned on/off by applying/not applying a voltage to the liquid crystal display device by means of a power supply 64, while the above-mentioned light beam was incident to the liquid crystal display device. The light transmittances were measured by measuring four outgoing beams of the liquid crystal display device with lenses having a converging angle of 24°. All of the measured outgoing beams constituted an angle of 40° with respect to a vertical axis of the substrate 52. However, one measured outgoing beam tilted toward the top of the substrate 52 in a longitudinal direction; another measured outgoing beam tilted toward the bottom of the substrate 52 in the longitudinal direction; still another measured outgoing beam tilted to the right in a latitudinal direction; the other measured outgoing beam tilted to the left in the latitudinal direction. A ratio $T_{OFF}/T_{ON}$ was measured with respect to each of the four measured outgoing beams, wherein $T_{OFF}$ is a light transmittance when no voltage is applied, and $T_{ON}$ is a light transmittance when a voltage is applied. The contrast ratios CR were defined as a mean of the four resultant ratios $T_{OFF}/T_{ON}$.

Next, for the purpose of measuring the refractive index of the polymer matrix 57, a polymer resin film was fabricated in the following manner: First, a homogeneous mixture containing 0.3 g of the above-mentioned photopolymerizable material and 0.0015 g of the above-mentioned photopolymerization initiator was also prepared. The mixture was injected into a cell consisting essentially of glass substrates (thickness: 6 μm). The cell was then irradiated with UV-rays for 3 minutes, whereby the photopolymerizable material was cured so as to form a polymer resin film. The UV-rays were obtained under a high-pressure mercury lamp where it had an illuminance of 10 mW/cm². The polymer resin film thus cured was taken out of the cell. Then, a refractive index of the polymer resin film was measured by means of an Abbe's refractometer at room temperature (25° C.). Results of the above-mentioned measurements are listed in Table 6.

In the present Example, phase separation of the liquid crystal and the polymer is controlled with the photomask so that the liquid crystal and the polymer are formed with regularity. Therefore, the liquid crystal domains 62 within each liquid crystal region 54 are oriented radially or randomly, as is described above. As a result, liquid crystal molecules 65 as a whole stand omnidirectionally, whereby viewing angle characteristics of the liquid crystal display device of the present example are improved.

A main objective of the present invention is to improve the contrast of the liquid crystal display device and especially to minimize the coarseness problem of a displayed image by restraining the scattering of light occurring due to a difference in the refractive indices of each liquid crystal region 54 and the polymer matrix 57. In the present example, the difference in the refractive indices of each liquid crystal region 54 and the polymer matrix 57 is kept small by ensuring that a refractive index $n_p$ of the polymer matrix 57 falls within a range between [an ordinary refractive index $n_o$ of each liquid crystal molecule 65—0.04] and the refractive index $(n_e+n_o)/2$ of each liquid crystal molecule 65 in a randomly oriented state.

Herein, the following hold with reference to FIG. 15:

(A) When the refractive index $n_p$ of the polymer matrix 57 is smaller than [the ordinary refractive index $n_o$ of each liquid crystal molecule 65—0.04], the refractive index $n_p$ and the refractive index $(n_e+n_o)/2$ of the liquid crystal molecule 65 in a randomly oriented state have a large difference. Therefore, the coarseness problem under no voltage applied worsens.

(B) When the refractive index $n_p$ of the polymer matrix 57 is larger than the refractive index $(n_e+n_o)/2$ of each liquid crystal molecule 65 in a randomly oriented state, the refractive index $n_p$ and the ordinary refractive index $n_o$ of the liquid crystal molecule 65 have a large difference. Therefore, the coarseness problem under a voltage applied worsens.

(C) By ensuring that the refractive index $n_p$ of the polymer matrix 57 is in a range between [the ordinary refractive index $n_o$ of each liquid crystal molecule 65—0.04] and the refractive index $(n_e+n_o)/2$ of the liquid crystal molecule 65 in a randomly oriented state, the difference between the refractive index of the liquid crystal molecule 65 and the refractive index $n_p$ of the polymer matrix 57 can be made small in both of i) cases where a voltage is applied to the liquid crystal cell 51 (that is to say, the difference between the ordinary refractive index $n_o$ of the liquid crystal molecule 65 and the refractive index $n_p$ of the polymer matrix 57 is small) and ii) cases where no voltage is applied to the liquid crystal cell 51 (that is to say, the difference between the refractive index $(n_e+n_o)/2$ of the liquid crystal molecule 65 in a randomly oriented state and the refractive index $n_p$ of the polymer matrix 57 is small).

Moreover, the difference between the refractive index of the liquid crystal molecule 65 and that of the polymer matrix 57 can be made to vary within only a small range in spite of changes in voltage between a state where a voltage is applied and a state where no voltage is applied.

Thus, the contrast of the liquid crystal display device is improved, and the coarseness problem of a displayed image can be minimized.

EXAMPLE 19

As Example 19, a liquid crystal display device and a polymer resin film were fabricated as follows:

A homogeneous mixture containing 4 g of a liquid crystal material (ZLI-5080, manufactured by Merck & Co., Inc.) added with 0.3%, by weight, of a chiral dopant (S-811, manufactured by Merck & Co., Inc.); a photopolymerizable material consisting of 0.1 g of n-butylmethacrylate, 0.85 g of perfluorooctyl methacrylate, and 0.05 g of styrene; and 0.0025 g of a photopolymerization initiator (Irgacure 651, manufactured by CIBA-GEIGY Corporation) was prepared. For the purpose of measuring refractive indices, a homogeneous mixture containing the above-mentioned photopolymerizable material and photopolymerization initiator was also prepared. Thereafter, the liquid crystal display device and the polymer resin film were fabricated in the same manner as in Example 18, respectively using the above-mentioned mixtures. Then, various refractive indices of the liquid crystal display device and the polymer resin film were measured. Results of the measurements are listed below in Table 6.

COMPARATIVE EXAMPLE 9

As Comparative Example 9, a liquid crystal display device and a polymer resin film were fabricated as follows:

A homogeneous mixture containing 4 g of a liquid crystal material (ZLI-5048-000, manufactured by Merck & Co., Inc.) added with 0.3%, by weight, of a chiral dopant (S-811, manufactured by Merck & Co., Inc.); a photopolymerizable material consisting of 0.95 g of a bifunctional acrylate monomer (R-604, manufactured by Nippon Kayaku K.K.) and 0.05 g of styrene; and 0.0025 g of a photopolymerization initiator (Irgacure 651, manufactured by CIBA-GEIGY Corporation) was prepared. For the purpose of measuring refractive indices, a homogeneous mixture containing the above-mentioned photopolymerizable material and photopolymerization initiator was also prepared. Thereafter, the liquid crystal display device and the polymer resin film were fabricated in the same manner as in Example 18, respectively using the above-mentioned mixtures. Then, various refractive indices of the liquid crystal display device and the polymer resin film were measured. Results of the measurements are listed below in Table 6.

COMPARATIVE EXAMPLE 10

As Comparative Example 10, a liquid crystal display device and a polymer resin film were fabricated as follows:

A homogeneous mixture containing 4 g of a liquid crystal material (ZLI-4281, manufactured by Merck & Co., Inc.) added with 0.3%, by weight, of a chiral dopant (S-811, manufactured by Merck & Co., Inc.), a photopolymerizable material consisting of 0.95 g of a bifunctional acrylate monomer (R-684, manufactured by Nippon Kayaku K.K.) and 0.05 g of styrene, and 0.0025 g of a photopolymerization initiator (Irgacure 651, manufactured by CIBA-GEIGY Corporation) was prepared. For the purpose of measuring refractive indices, a homogeneous mixture containing the above-mentioned photopolymerizable material and photopolymerization initiator was also prepared. Thereafter, the liquid crystal display device and the polymer resin film were fabricated in the same manner as in Example 18, respectively using the above-mentioned mixtures. Then, various refractive indices of the liquid crystal display device and the polymer resin film were measured. Results of the measurements are listed below in Table 6.

COMPARATIVE EXAMPLE 11

As Comparative Example 11, a liquid crystal display device and a polymer resin film were fabricated as follows:

A homogeneous mixture containing 4 g of a liquid crystal material (ZLI-4792, manufactured by Merck & Co., Inc.) added with 0.3%, by weight, of a chiral dopant (S-811, manufactured by Merck & Co., Inc.); a photopolymerizable material consisting of 0.95 g of a bifunctional acrylate monomer (R-684, manufactured by Nippon Kayaku K.K.) and 0.05 g of styrene; and 0.0025 g of a photopolymerization initiator (Irgacure 651, manufactured by CIBA-GEIGY Corporation) was prepared. For the purpose of measuring refractive indices, a homogeneous mixture containing the above-mentioned photopolymerizable material and photopolymerization initiator was also prepared. Thereafter, the liquid crystal display device and the polymer resin film were fabricated in the same manner as in Example 18, respectively using the above-mentioned mixtures. Then, various refractive indices of the liquid crystal display device and the polymer resin film were measured. Results of the measurements are listed below in Table 6.

TABLE 6

|  | $n_p$ | $n_o$ | $(n_e + n_o)/2$ | $\|n_o - n_p\|$ | contrast ratio CR |
|---|---|---|---|---|---|
| Example 18 | 1.500 | 1.479 | 1.526 | 0.021 | 41 |
| Example 19 | 1.485 | 1.471 | 1.513 | 0.014 | 47 |
| Comparative Example 9 | 1.450 | 1.504 | 1.574 | 0.054 | 28 |
| Comparative Example 10 | 1.535 | 1.474 | 1.496 | 0.061 | 18 |
| Comparative Example 11 | 1.535 | 1.479 | 1.526 | 0.056 | 25 |

In each of Examples 18 and 19, as is seen from Table 6, it is ensured that a refractive index $n_p$ of the polymer matrix falls within a range between [an ordinary refractive index $n_o$ of each liquid crystal molecule—0.04] and the refractive index $(n_e+n_o)/2$ of each liquid crystal molecule in a randomly oriented state, as was prescribed earlier. A difference in the refractive indices of each liquid crystal region and the polymer matrix is therefore reduced, whereby scattering of light at interfaces of the liquid crystal regions and the polymer matrix is minimized. As a result, the coarseness problem of a displayed image is alleviated. It can be seen that the liquid crystal display devices of Examples 18 and 19 have higher contrast ratios than those of the liquid crystal display devices of Comparative Examples 9 and 10, whose refractive indices $n_o$, $n_p$, and $n_e$ do not meet the above-mentioned relationship.

Moreover, it is observed that the liquid crystal display device of Comparative Example 11 has a very low contrast ratio as compared to that of the liquid crystal display device of Example 18, although the same liquid crystal material is used in Example 18 and Comparative Example 11. This is because, in Comparative Example 11, a refractive index $n_p$ of the polymer matrix, an ordinary refractive index $n_o$ of each liquid crystal molecule, and an extraordinary refractive index $n_e$ of each liquid crystal molecule do not meet the above-mentioned relationship.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a polymer dispersed liquid crystal complex film including the steps of:

a step for preparing a mixture of a polymerizable material and a liquid crystal material, wherein the polymerizable material includes a monofunctional monomer and at least one of a multi-functional monomer and a multi-functional oligomer mixed at a ratio in the range of 93:7 to 40:60; and a phase separation step for processing the mixture into a polymer dispersed liquid crystal complex film by a phase separation conducted through polymerization, the polymer dispersed liquid crystal complex film consisting of a liquid crystal composition and a polymer resin composition, wherein a value $\Delta T$ is 25° C. or less, and a glass transition temperature $T_g$ of the polymer resin composition is 60° C. or more, the value $\Delta T$ being defined as a difference between a phase transition temperature $T_{matrix}$ of the polymer dispersed liquid crystal complex film and a phase transition temperature $T_{CI}$ of the liquid crystal composition between a liquid crystal phase and an isotropic liquid phase thereof.

2. A method for producing a polymer dispersed liquid crystal display device including the steps of:

a step for preparing a mixture of a polymerizable material and a liquid crystal material, wherein the polymerizable material includes a monofunctional monomer and at least one of a multi-functional monomer and a multi-functional oligomer mixed at a ratio in the range of 93:7 to 40:60; and a phase separation step for processing the mixture by a phase separation conducted through polymerization into a polymer dispersed liquid crystal complex film as a display medium interposed between a pair of electrode substrates, the polymer dispersed liquid crystal complex film consisting of a liquid crystal composition and a polymer resin composition, wherein a value $\Delta T$ is 25° C. or less, and a glass transition temperature $T_g$ of the polymer resin composition is 60°

C. or more, the value $\Delta T$ being defined as a difference between a phase transition temperature $T_{matrix}$ of the polymer dispersed liquid crystal complex film and a phase transition temperature $T_{CI}$ of the liquid crystal composition between a liquid crystal phase and an isotropic liquid phase thereof.

3. A method for producing a liquid crystal display device according to claim 2, wherein the phase separation step includes a first phase separation step for phase-separating the mixture through polymerization, and a second phase separation step for further phase-separating the mixture through polymerization, the second phase separation step being conducted at a lower temperature than the first phase separation step.

4. A method for producing a liquid crystal display device according to claim 2, wherein the polymerization is conducted by irradiating the mixture with light, the light having a distribution of intensities ranging from a first intensity to a second intensity lower than the first intensity.

5. A method for producing a liquid crystal display device according to claim 4, wherein the light having a distribution of intensities ranging from a first intensity to a second intensity lower than the first intensity is obtained through means for lowering the intensity of the light at a pixel region.

6. A method for producing a liquid crystal display device according to claim 2, wherein the liquid crystal composition obtained through the phase separation step has a positive anisotropy of dielectric constant, and includes at least one of a fluorine-containing liquid crystal compound and a chlorine-containing liquid crystal compound.

7. A method for producing a liquid crystal display device according to claim 2, wherein the polymer resin composition obtained through the phase separation step includes at least one selected from the group consisting of a fluorine-containing compound, a chlorine-containing compound, and a silicon-containing compound.

8. A method for producing a liquid crystal display device according to claim 2, wherein the liquid crystal composition obtained through the phase separation step includes at least one dichroic dye.

9. A method for producing a liquid crystal display device according to claim 2, wherein the liquid crystal composition obtained through the phase separation step includes at least one of an optically active chiral dopant and a cholesteric liquid crystal added in a ratio, by weight, in a range of 0.1% to 10% thereto.

* * * * *